(12) United States Patent
Taylor et al.

(10) Patent No.: US 8,935,042 B2
(45) Date of Patent: Jan. 13, 2015

(54) VEHICLE TYRE CHECKING SYSTEM

(75) Inventors: Paul Michael Gerald Taylor, Leafield (GB); David Rathbone, Banbury (GB)

(73) Assignee: Wheelright Limited, Oxfordshire (GB)

( * ) Notice: Subject to any disclaimer, the term of this patent is extended or adjusted under 35 U.S.C. 154(b) by 517 days.

(21) Appl. No.: 13/376,673

(22) PCT Filed: Jun. 8, 2010

(86) PCT No.: PCT/GB2010/001110
§ 371 (c)(1),
(2), (4) Date: Dec. 28, 2011

(87) PCT Pub. No.: WO2010/142942
PCT Pub. Date: Dec. 16, 2010

(65) Prior Publication Data
US 2012/0101746 A1 Apr. 26, 2012

(30) Foreign Application Priority Data
Jun. 8, 2009 (GB) .................................. 0909815.3

(51) Int. Cl.
*G01L 17/00* (2006.01)
*G01L 1/14* (2006.01)

(52) U.S. Cl.
CPC ............... *G01L 17/005* (2013.01); *G01L 1/146* (2013.01)
USPC ............................ 701/34.4; 73/146.2; 702/50

(58) Field of Classification Search
None
See application file for complete search history.

(56) References Cited

U.S. PATENT DOCUMENTS

| 695,304 | A | * | 3/1902 | Gray | ............................. 411/315 |
| 4,084,431 | A | * | 4/1978 | Newby | ........................ 73/146.2 |
| 5,260,520 | A | | 11/1993 | Muhs et al. | |
| 5,396,817 | A | * | 3/1995 | Rosensweig | ................. 73/146.2 |
| 5,445,020 | A | * | 8/1995 | Rosensweig | ................. 73/146.2 |

(Continued)

FOREIGN PATENT DOCUMENTS

| EP | 0545641 | 6/1993 |
| EP | 0656269 | 6/1995 |

(Continued)

OTHER PUBLICATIONS

International Search Report, PCT International Application No. PCT/GB2010/001110 dated Oct. 4, 2010.

*Primary Examiner* — Harshad R Patel
(74) *Attorney, Agent, or Firm* — McDonnell Boehnen Hulbert & Berghoff LLP

(57) ABSTRACT

Apparatus (4; 5) for checking the inflation pressure of a tire (3) of a vehicle (2) while the tire is being moved over the apparatus in a direction of travel (A). The apparatus comprises a base (7), a platform (8) which is mounted over the base, a first load sensor system (9) arranged between the platform and the base, and a second load sensor system (12) mounted on an upper surface of the platform and comprising a linear array of high resolution sensors (13, 25) extending across the platform. A data processing unit (6) processes data obtained by sampling the outputs of the first and second sensor system and provides an indication of the inflation pressure of the tire. The data obtained by sampling the output of the first sensor system may be used to determine the total load borne by the platform, and/or the direction of travel of the tire over the platform, and/or the speed of travel of the tire over the platform and/or the tracking angle of the vehicle tire. The data may also be used to determine a time interval during which data from the second sensor system is to be used to provide a representative sensor load value.

22 Claims, 7 Drawing Sheets

(56) References Cited

U.S. PATENT DOCUMENTS

| | | |
|---|---|---|
| 5,641,900 A | 6/1997 | Di Bernardo et al. |
| 5,942,681 A | 8/1999 | Vollenweider et al. |
| 6,301,544 B1 * | 10/2001 | Sonderegger ............... 701/117 |
| 6,626,035 B1 * | 9/2003 | Dent et al. ................. 73/146.2 |
| 6,823,728 B1 | 11/2004 | Barnes |
| 7,250,577 B2 * | 7/2007 | Schilling et al. ................ 177/1 |
| 7,406,386 B2 * | 7/2008 | Brett et al. .................... 702/41 |
| 8,626,413 B2 * | 1/2014 | Kammann ..................... 701/69 |
| 2002/0102743 A1 * | 8/2002 | Majumdar et al. ........... 436/518 |
| 2008/0209995 A1 * | 9/2008 | Taylor et al. ................... 73/146 |
| 2010/0274447 A1 * | 10/2010 | Stumpf .......................... 701/36 |
| 2010/0292953 A1 * | 11/2010 | Pingel ......................... 702/138 |

FOREIGN PATENT DOCUMENTS

| | | |
|---|---|---|
| FR | 2121283 A5 * | 8/1972 |
| JP | S6412231 | 1/1989 |
| WO | WO00/11442 | 3/2000 |
| WO | WO2006/003467 | 1/2006 |

* cited by examiner

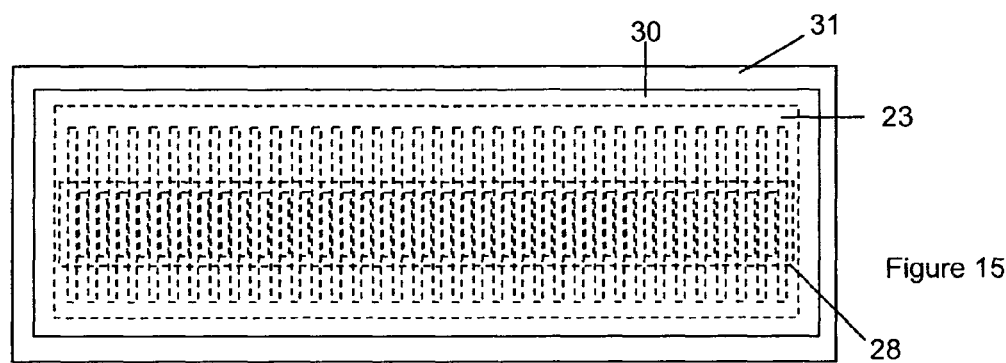
Figure 15
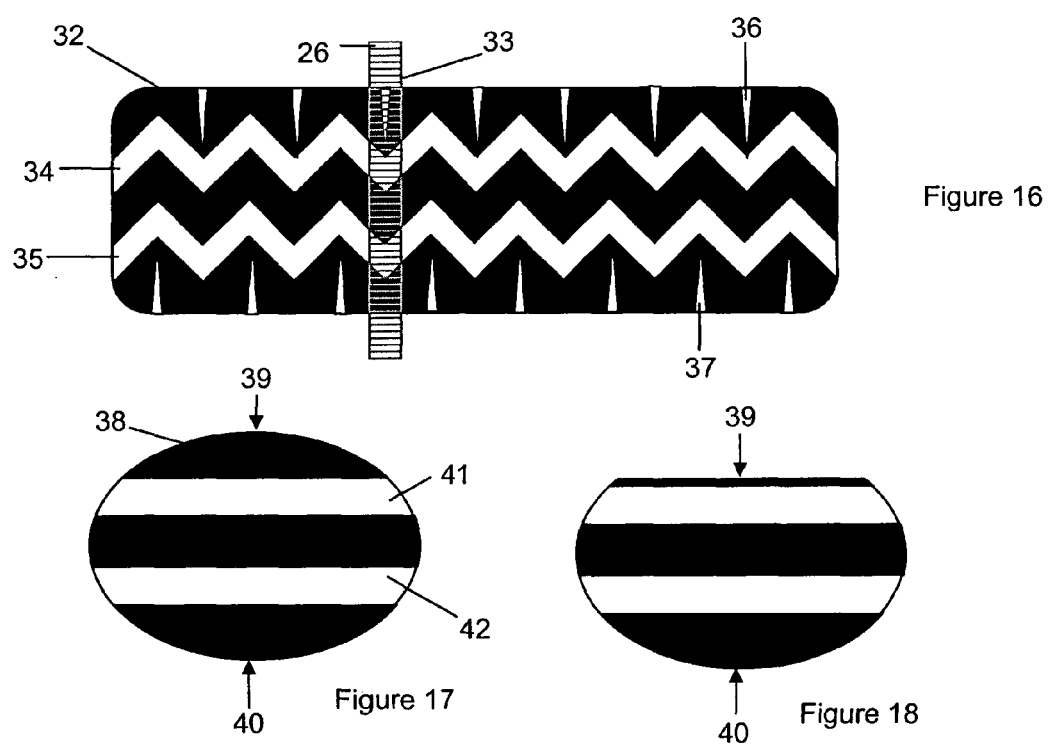
Figure 16
Figure 17
Figure 18
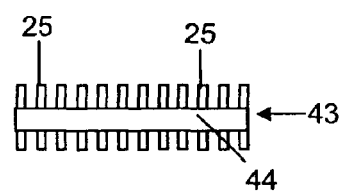
Figure 19
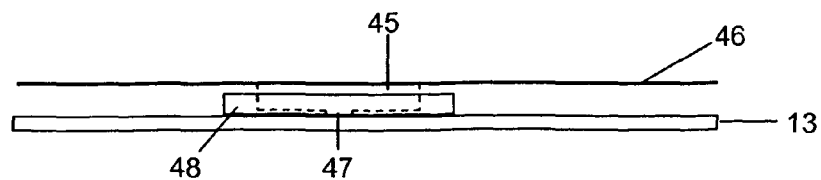
Figure 20

VEHICLE TYRE CHECKING SYSTEM

TECHNICAL FIELD

This invention relates to a vehicle tyre checking system. The invention is particularly, but not exclusively, concerned with a system which can determine the pressure in a vehicle tyre.

BACKGROUND ART

There have been a number of proposals for determining the pressure of a vehicle tyre whilst it passes over an array of sensors. These may rely on the assumption that the contact pressure is an approximation of the tyre inflation pressure. The contact area of a tyre with a surface can be taken as the weight borne by the tyre, divided by the tyre inflation pressure. As the tyre inflation decreases, the contact area increases, although the relationship depends on the structural properties of the tyre. For example, at very low inflation pressures the reinforced sidewalls of the tyre will take a significant portion of the load directly. An alternative approach relies on investigating the lateral profile of the tyre footprint. If a tyre is over-inflated, there will be a narrow, relatively sharp profile. If a tyre is under-inflated, there will be a wider, relatively flat profile. Examples of such systems are disclosed in WO 00111442, EP 0545641 and EP 0656269.

In some cases there may be a two dimensional array of sensors, and in others there may be a linear array of sensors. In either case, outputs from the sensors are sampled at intervals as the tyre passes over. These outputs may be used to indicate the shape of the tyre footprint. In the case of a linear array of sensors, or a two dimensional array of limited extent in the direction of travel, the shape of the tyre footprint is obtained indirectly. A row of sensors extending across the tyre will always stay in contact with the same portion on the circumference of the tyre. That portion's position in the tyre footprint will alter, and the length of the line of contact will increase from initial contact, and then decrease until contact ceases. The shape of the tyre footprint is extrapolated from the sensor data.

Most known systems ignore the effects of the tread cut into the surface of the tyre. There are tread gaps where there is no contact between the tyre and the sensor array, and it is not possible to use the data to determine, for example, the area of contact between the tyre and the surface within the footprint of the tyre. This can lead to inaccuracies in the measurement of such quantities as tyre pressure, load on a wheel, axle load and vehicle weight.

In WO 2006/003467 there is disclosed a system which uses sensors of sufficiently high resolution to detect tread gaps on a tyre, so that is possible to estimate the extent of tread coverage and to determine the tyre pressure using sensors which are fully in contact with the tyre rubber, without the area of contact being affected by a tread gap. The system uses a linear array of sensors, and the output data is from a line of contact at a circumferential position on the tyre. Some calculations are made based on the areas of the individual sensors, and for some purposes there is provided an estimate of the area of the tyre footprint.

U.S. Pat. No. 6,823,728 discloses a system for estimating tyre pressure in which there is provided a weight sensor and, overlying that, an area sensor. The area sensor estimates the contact area directly. This may be by means of: a capacitive sensor; or line switches to determine the length and width of the tyre contact area; or a linear switch array whose outputs are sampled and used together with vehicle speed, detected using a pair of line switches, to estimate the tyre footprint area. The use of the switch array method is said to provide a more accurate estimation of the area than if using only the length and width. With the total weight known, the tyre pressure can be calculated by dividing the weight borne by the wheel, by the tyre footprint area.

DISCLOSURE OF INVENTION

According to a first aspect, the present invention provides apparatus for checking the inflation pressure of a vehicle tyre whilst being moved over the apparatus in a direction of travel, comprising: a base; a platform which is mounted over the base and which is of sufficient extent in the direction of travel and laterally of the direction of travel to accommodate the entire footprint of a vehicle tyre; a first load sensor system arranged between the platform and the base, for providing data indicative of varying loads exerted on the base by the platform whilst the tyre is moved over the platform in the direction of travel; means for sampling the outputs of the first load sensor system; a second sensor system mounted on an upper surface of the platform and comprising an array of sensors extending across the platform, the array having a lateral extent sufficient to accommodate the width of a vehicle tyre, each of the sensors in the array being a load sensor which provides varying outputs indicative of the value of the load on the sensor whilst the tyre is moved over the platform in the direction of travel; means for sampling the outputs of the second sensor system; and data processing means configured to process the data obtained from sampling the outputs of the first and the second sensor systems, and to provide an indication of the inflation pressure of the tyre.

This aspect of the invention also provides a method for checking the inflation pressure of a vehicle tyre whilst being moved over apparatus in a direction of travel, the apparatus comprising: a base; a platform which is mounted over the base and which is of sufficient extent in the direction of travel and laterally of the direction of travel to accommodate the entire footprint of a vehicle tyre; a first load sensor system arranged between the platform and the base, for providing data indicative of the load exerted on the base by the platform; and a second sensor system mounted on an upper surface of the platform and comprising an array of sensors extending across the platform, the array having a lateral extent sufficient to accommodate the width of a vehicle tyre, each of the sensors of the array being a load sensor which provides varying outputs indicative of the value of the load on the sensor; the method comprising the steps of moving the tyre over the apparatus, sampling the outputs of the first sensor system, sampling the outputs of the second sensor system; and processing the data obtained from sampling the outputs of the first and the second sensor system to provide an indication of the inflation pressure of the tyre using the representative second sensor load value.

In accordance with this aspect of the present invention, an indication of the tyre pressure can be determined without it being necessary to calculate the tyre footprint area using the outputs of the sensors in the array of the second sensor system. If a pressure sensing element has a portion fully in contact with the surface of a tyre, i.e. not bridging a tread gap, then there is a relationship between the tyre inflation pressure and the force detected by the sensing element which can be expressed as:

$$P = aF_s + b \qquad (1)$$

where P is the inflation pressure, $F_s$ is the load on the sensing element, and a and b are constants, the values of the constants depending on the construction of the tyre, such as the effect of the inherent properties of the materials concerned, and the design of the apparatus, such as the contact area of the sensing element. Thus, by obtaining a representative second sensor load value which can be used as $F_s$ the tyre pressure P can be calculated.

Thus, preferably the data processing means is configured to provide at least one representative load value from the array of sensors of the second sensor system, and the data processing system is configured to provide an indication of the inflation pressure of the tyre using this representative load value.

By a "representative" load value, is meant a value that is a reasonable indication of the load on an ideal sensor that is clear of interferences such as sidewall effects or tread gaps. The representative value could be, for example, that obtained from a sensor providing the highest reading; an average (whether mean, median, mode and so forth) from a range of sensors providing the highest readings; an average from a range of sensors, excluding extreme values, low or high; an average from all sensors; and so forth. There could be a plurality of representative second sensor load values, to give a load value profile across the width of the tyre. This would enable there to be an indication of tyre pressure, to the extent of indicating whether the profile is consistent with normal inflation, under-inflation, or over-inflation.

As will be explained in more detail below, for any given second sensor in the array of the second sensor system, the outputs that are used may be chosen from a particular point or region in the load/time profile from that sensor so as to give more reliable values.

One manner of using the outputs from the first sensor system is to calculate the total load on the platform and to use that in the calculation of the tyre pressure. As noted above from equation (1) there is a relationship between the tyre inflation pressure, and the load on a particular sensing element. The conventional approach is that for a given tyre pressure, as the load on the tyre increases, the tyre footprint expands and the load is spread over a greater area, and that that this results in the pressure on the surface under the tyre remaining constant. However, it has now been established that the equation (1) may be accurate only for a constant tyre load. If a tyre acted as a simple balloon, then as the vehicle weight increased, the load on a tyre would increase but the tyre's footprint would also expand, so that the pressure remains constant. However, the physical characteristic of a normal vehicle tyre are not those of a balloon and the tyre stiffness, for example, affects the behaviour. Thus, as the share of the vehicle's weight borne by the tyre is varied, the pressure on an individual sensing element varies. This can be expressed as stating that at least one of the constants a and b in equation (1) is not a true constant but varies as a function of the total load. This total load can be determined from the outputs from the first array of load sensors.

For example, by obtaining a representative second sensor load value for a range of known tyre pressures and for a range of known total loads on the tyre, it is possible to build up a relationship or to plot values for the tyre pressure associated with particular representative second sensor load values and total loads.

For use in such an arrangement, the first sensor system could use a single sensor to measure the total load from the platform. This sensor could be distributed underneath the platform, for example being a tube containing a gas or liquid which is connected to a pneumatic or hydraulic sensor. The tube could follow a serpentine path.

However, in some preferred embodiments the first sensor system comprises a plurality of sensors at points distributed longitudinally and laterally over the base, to indicate the loads on the base from the platform at various points. The outputs from these sensors may be used to calculate the total load or in various ways, as discussed in more detail below, for example to determine the speed and/or direction of movement of the tyre, the total load on the platform, the position of the tyre on the platform so as to initiate sampling of the outputs from the second sensors, and so forth.

In putting this aspect of the invention into practice, the array of sensors of the second sensor system can be as disclosed in, for example, WO 00/11442, EP 0545641 or EP 0656269. Preferably, however, the array of second sensors is in the form of a linear array, in a manner as disclosed in WO 2006/003467, and the individual sensors are of sufficiently high resolution to detect portions along a line across the tyre where there is no contact as a result of there being a tyre tread gap. One way of expressing the high resolution nature of the linear array of sensors, is to say that the extent of a contact surface of a sensor, both along a line across the tyre and perpendicular to that line, is such that the contact surface of the sensor can fall completely within the confines of a tread gap; or such that the contact surfaces of a plurality of adjacent sensors can fall within the confines of the same tread gap simultaneously. This does not mean that all tread gaps can contain a sensor contact surface or a plurality of sensor contact surfaces, and as discussed later it may be desirable to have some tread gaps bridged, adjacent the edges of a tyre.

When using such a high resolution linear array, there will be a plurality of sensors that are aligned with continuous portions of the tyre surface without the intervention of tread gaps. Some of these sensors will be in or towards a central region of the tyre, away from the side walls where outputs could be influenced by factors other than the tyre pressure. Accordingly, there will be sensor outputs which can be relied upon for the purposes of subsequent calculations.

Tyre pressure can be calculated from sensor outputs using various methods. Tyre pressure could be checked by investigating the contact profile, to determine whether the tyre is under-inflated or over-inflated. In another method, the data from checking one tyre could be compared with the data from checking other tyres of the same vehicle, to look for a relative degree of under- or over-inflation. Alternatively, the data from checking one tyre could be compared with stored data for that vehicle, obtained for example by carrying out the method on the vehicle with the tyres at a known correct pressure; or with stored data for that type of vehicle, obtained for example by carrying out the method on another vehicle of the same type with the tyres at a known correct pressure. Again, checking could be in the form of looking for a relative degree of under- or over-inflation. An acceptable range of variation could be programmed in to the system. Detecting a vehicle so that comparative data can be accessed, can be done using for example the methods disclosed in WO 2006/003467 and may include automatic number plate optical recognition, wireless access of an identifier, using short range communications such as Bluetooth™ or RFID, and so forth.

Particularly in the case of a fleet of vehicles such as lorries, delivery vans, buses or coaches, where there may be several vehicles of the same type, it would be possible to calibrate the system using tyres at known pressures, so that for a vehicle of a given type the sensor output data can be translated into an approximate tyre pressure or range of tyre pressures by comparison with stored data for those pressures or ranges.

As noted above, in some embodiments of this aspect of the invention, the data from the first sensor system is also used in determining tyre pressure, as this data will indicate directly the load on the particular wheel. Where there is stored data for reference purposes, this could also be in a wheel load dependent form, such that the tyre pressure determined by the system for a given output from sensors in the array of the second sensor system will depend on the load information from the first sensor system. Similarly, if there is an algorithm for determining tyre pressure from the data from the sensors in the array of the second sensor system, without reference to stored data, this could include wheel load dependent factors. In either case, other factors such as temperature, either ambient or of the tyre itself, could also be taken into account. Such other factors could, for example, include tyre type or particular make of tyre.

Whilst a single linear sensor array of high resolution sensors is used in some embodiments, it would be possible to use a plurality of such linear sensors, such as two, three or more, all mounted on the same platform.

As noted above, when a tyre rolls over a line of sensors, there will be contact on a single line extending across the tyre, at a particular point on the circumference of the tyre. High resolution sensors will detect the edges of the tyre footprint, which will vary as the tyre rolls over. By determining the speed of movement, for example by using the outputs from the first sensors, it is possible to build up an "image" of the outline of the tyre footprint. The area within the outline of the tyre footprint can be calculated, but this will not correspond to the area of contact because tread gaps—where there is no contact—need to be taken into account. The linear array of high definition sensors will detect positions where there are tread gaps, but this is only along a single line of contact. The configuration of areas of contact and tread gaps along that line may not correspond to the configuration at other points around the tyre circumference and in that case it is not possible to build up an "image" of the tyre footprint that shows the tread pattern. Wherever a tread gap is detected along the line of contact, that will result in a longitudinally extending line on the "image" of the footprint, regardless of whether the gap is a circumferential groove around the tyre, or part of a "zig-zag" pattern. However, it would be possible to calculate the proportion of tread gaps along the line of contact for example when the tyre footprint is at its maximum width, or an average over all or some of the samples. If it is assumed that the proportion of tread gaps will be similar at other positions around the tyre circumference, then that proportion could be applied to the footprint area to determine an estimate of the area of contact and conversely an estimate of the amount of tread coverage.

Given an estimated area of contact, and the outputs from the second set of sensors, it is possible to calculate an estimate of the total load on the wheel using methods such as those discussed in WO 2006/003467. However, apparatus in accordance with this aspect of the invention can also provide a direct measure of the load on the wheel using the outputs from the first sensor system. The two results will not be identical and this could be used in various ways. For example, the degree of difference could be used to adjust calculation of the tyre pressure from the second sensor system. Additionally or alternatively, given the overall area of the tyre footprint and the outputs from the second sensor system, the actual load on the wheel determined by the first sensor system can be used to estimate the proportion of the tyre footprint where there is, or is not, contact as a result of the tyre tread pattern.

The first sensor system can be used for various additional purposes. For example, the first sensor system comprises a plurality of sensors distributed as an array over the base, their outputs can provide an indication of the actual direction of movement of the tyre. If the tyre is moving strictly in the longitudinal direction, the sensors will provide different outputs than when the tyre is travelling at an angle to that direction. If necessary, the angle of movement can be taken into account when calculating tyre pressure and/or tyre width, and/or footprint area and/or tread coverage. For example, if the tyre moves over the array of sensors of the second system at an angle, the line of contact will be longer. This will make the width of the tyre and the area of the tyre footprint seem larger than they are. But knowing the angle of deviation, a correction can be applied to the data or to the results to account for this.

The first sensor system can be used to detect when a tyre first contacts the apparatus. The time between this and the first outputs from the sensors of the second sensor system can be used to determine the speed at which the tyre is moving over the platform, since the distance between the front edge of the platform and the sensors is known. From this, the length of the tyre contact patch can be calculated by using the time for which the tyre is on contact with the sensors.

The first sensor system may be used to provide an indication of the vehicle's weight, and that may be used as a coarse indication of the type of vehicle involved. Lorries, for example, will always weigh more than passenger cars. Even if it is not known directly what type of vehicle is involved, the system could be configured to select something which is likely to be appropriate. The first and second sensor systems can also provide other information that can help to identify the type of vehicle involved, such as: the width of the tyres; the number of wheels on an axle (the system being able to distinguish between two wheels, and one wide wheel); the number of axles; the wheelbase of the vehicle; the approximate tyre pressure (much higher for a lorry than for a passenger car); the coarseness of the tread pattern; and so forth.

The first sensor system preferably comprises a plurality of rows of sensors spaced along the direction of vehicle movement, for example two, three or more. In one embodiment there are three rows, one adjacent the front edge of the platform, one adjacent the rear edge, and one position between the two, for example at about a mid point. Within each row there will be a plurality of first sensors, Preferably, therefore, there is a regular matrix of sensors arranged in rows and columns. In one particular embodiment, by way of example, there may be three rows of eight sensors.

In the preferred embodiments of this aspect of the invention, a high resolution linear array of sensors is used for the second sensor system, which can distinguish between points where there is contact and points where there is no contact as a result of there being a tread pattern. It has now been determined that in some cases this can provide an inaccurate indication of tyre width and the shape of the tyre footprint.

In some cases, adjacent one or both sides of a tyre there are laterally directed tread gaps. If one of these is aligned with a linear sensor array, sensors at the end of the line across the tyre will detect the tread gap and will provide no output. Outputs will be provided only from sensors that are further inwards. An analysis of the data will thus provide results similar to those that would be obtained from a narrower tyre, leading to inaccurate data. One way of addressing this problem would be to have two (or more) linear arrays, spaced apart by a distance sufficient to ensure that even if one array is aligned with a laterally extending tread gap adjacent the edge of a tyre, the other array will provide correct readings in respect of the width of the tyre. However, a preferred embodiment of this aspect of the present invention provides an alternative approach to the problem. In accordance with this embodiment, the second sensor system is a laterally extending linear array of sensors which provide outputs indicative of loads at points along a line across the tyre whilst the tyre is moved over the apparatus in the direction of travel, and each sensor is associated with an actuating portion whose width is sufficiently small to provide the array with sufficiently high resolution to detect points along said line where there is no contact with the tyre as a result of a tread pattern in the tyre; and wherein each actuating portion is elongate and extends in the direction of travel by a sufficient extent to bridge laterally extending tread gaps adjacent an edge of the tyre.

Thus, a more accurate indication of the width of the tyre footprint can be given, whilst there will still be actuating portions that are entirely in contact with the surface of the tyre and actuating portions that can detect tread gaps.

In U.S. Pat. No. 5,942,681 there is a disclosed a system which analyses the transverse profile of the tyre footprint. This uses an array of sensors which are elongate. However, the purpose of the system is to bridge all tread gaps. The sensors have widths of between 15 mm and 20 mm, and lengths of at least 50 mm, the length being chosen so that a sensor is in contact with at least three portions of the tyre surface, i.e. so that it bridges two tread gaps. This is a low resolution system.

In embodiments of this aspect of the invention, the width of the head of an actuating portion may be, for example: no more than about 1 mm; no more than about 1.5 mm; no more than about 2 mm; no more than about 2.5 mm; no more than about 3 mm; no more than about 3.5 mm; no more than about 4 mm; no more than about 4.5 mm; or no more than about 5 mm. The width of the head of an actuating portion may be, for example: between about 0.5 mm and about 0.75 mm; between about 0.75 mm and about 1 mm; between about 1 mm and about 1.25 mm; between about 1.25 mm and about 1.5 mm; between about 1.5 mm and about 2 mm; between about 2 mm and about 2.5 mm; between about 2.5 mm and about 3 mm; between about 3 mm and about 3.5 mm; between about 3.5 mm and about 4 mm; between about 4 mm and about 4.5 mm; or between about 4.5 mm and about 5 mm. The width of the head of an actuating portion may be in the range of: about 0.5 mm to about 1.5 mm; about 1 mm to about 2 mm; about 1 mm to about 3 mm; about 1 mm to about 5 mm; or about 2 mm to about 5 mm.

In embodiments of this aspect of the invention, the spacing between adjacent actuating portions may be, for example: no more than about 1 mm; no more than about 1.5 mm; no more than about 2 mm; no more than about 2.5 mm; no more than about 3 mm; no more than about 3.5 mm; no more than about 4 mm; no more than about 4.5 mm; or no more than about 5 mm. The spacing between adjacent actuating portions may be, for example: between about 0.5 mm and about 0.75 mm; between about 0.75 mm and about 1 mm; between about 1 mm and about 1.25 mm; between about 1.25 mm and about 1.5 mm; between about 1.5 mm and about 2 mm; between about 2 mm and about 2.5 mm; between about 2.5 mm and about 3 mm; between about 3 mm and about 3.5 mm; between about 3.5 mm and about 4 mm; between about 4 mm and about 4.5 mm; or between about 4.5 mm and about 5 mm. The spacing between adjacent actuating portions may be in the range of: about 0.5 mm to about 1.5 mm; about 1 mm to about 2 mm; about 1 mm to about 3 mm; about 1 mm to about 5 mm; or about 2 mm to about 5 mm.

In embodiments of this aspect of the invention, the spacing between adjacent actuating portions may be expressed in an alternative manner, as the pitch between adjacent actuating portions—i.e. the distance between the centres of the heads. The pitch between adjacent actuating portions must be at least slightly greater than the width of a single actuating portion, for there to be a slight gap between the adjacent actuating portions. In some embodiments, the pitch between adjacent actuating portions is between: about 1.5 and about 5 times the width of an actuating portion; about 1.5 and about 4 times the width of an actuating portion; about 1.5 and about 3 times the width of an actuating portion; about 1.5 and about 2.5 times the width of an actuating portion; or about 1.5 and about 2 times the width of an actuating portion. In absolute terms, the pitch between adjacent actuating portions may be: between about 1.25 mm and about 1.5 mm; between about 1.5 mm and about 2 mm; between about 2 mm and about 2.5 mm; between about 2.5 mm and about 3 mm; between about 3 mm and about 3.5 mm; between about 3.5 mm and about 4 mm; between about 4 mm and about 4.5 mm; or between about 4.5 mm and about 5 mm.

It will be appreciated that these possible values for the width of the head of an actuating portion, the spacing between adjacent actuating portions, and the pitch between adjacent actuating portions, can be applied also to the width, spacing between, and pitch between, sensor portions contacted by the actuating portions. Furthermore these values in respect of the actuating portions or sensor portions are applicable in respect of all aspects of the invention, whether or not there are actuating portions with elongated heads, and for example if there are actuator heads which are square or circular (in which case the width is taken as the diameter). It will also be appreciated that in preferred embodiments the sizes and spacings between elements such as the actuating portions or sensor portions will be constant of substantially constant, although there could be embodiments in which there are variations.

In embodiments of the invention, the length of the head of an actuating portion may be in the range of: about 10 mm to about 25 mm; about 10 mm to about 20 mm; about 10 mm to about 15 mm; or about 15 mm to about 25 mm. The length of the head of an actuating portion may be: no less than about 10 mm; no less than about 15 mm; no less than about 20 mm; or no less than about 25 mm; The length of the head of an actuating portion may be: no greater than about 15 mm; no greater than about 20 mm; no greater than about 25 mm; no greater than about 30 mm. The length of the head of an actuating portion may be: at least about 10 times the width of the head of the actuating portion; at least about 15 times the width of the head of the actuating portion; at least about 20 times the width of the head of the actuating portion; at least about 25 times the width of the head of the actuating portion; or at least about 30 times the width of the head of the actuating portion.

In preferred embodiments, the head of each actuating portion is substantially rectangular, and a depending portion which extends downwardly from the head and terminates in a sensor engaging portion of substantially smaller area than the head. The sensor engaging portion may, for example have a width which is the same as, or of the same order as, the width of the head. The sensor engaging portion may, for example have a length which is the same as, or of the same order as the width of the sensor engaging portion. The sensor engaging portion may be, for example square or circular.

The feature of the elongate actuating portion may be used independently of the first aspect of the invention, and thus according to a second aspect of the invention there is provided apparatus for checking characteristics of a vehicle tyre whilst being moved over the apparatus in a direction of travel, comprising a laterally extending linear array of sensors to provide outputs indicative of loads at points along a line across the tyre whilst the tyre is moved over the apparatus in the direction of travel, in which each sensor is associated with an actuating portion whose width is sufficiently small to provide the array with sufficiently high resolution to detect points along said line where there is no contact with the tyre as a result of a tread pattern in the tyre; and wherein each actuating portion is elongate and extends in the direction of travel by a sufficient extent to bridge laterally extending tread gaps adjacent an edge of the tyre.

This second aspect may also be expressed as a method, and thus viewed from this second aspect the invention also provides a method for checking characteristics of a vehicle tyre whilst being moved over apparatus in a direction of travel, comprising the steps of providing a laterally extending linear array of sensors to provide outputs indicative of loads at points along a line across the tyre whilst the tyre is moved over the apparatus in the direction of travel, in which each sensor is associated with an actuating portion having a head whose width is sufficiently small to provide the array with sufficiently high resolution to detect points along said line where there is no contact with the tyre as a result of a tread pattern in the tyre; wherein the head of each actuating portion is elongate and extends in the direction of travel by a sufficient extent to bridge laterally extending tread gaps adjacent an edge of the tyre; and wherein the extent of the head of each actuating portion in the direction of travel is sufficiently limited to ensure that there are portions of tyre towards a central region of the tyre where there is contact between the sensor array and the tyre and there are in such portions there are heads of actuating portions which do not bridge tread gaps.

It will be appreciated that any or all features of the second aspect of the invention may be combined with any or all features and optional features of the first aspect of the invention.

A linear sensor array for use in embodiments of the invention may use individual sensors of various types, such as piezoelectric, quantum tunnelling composites and so forth. However, a third aspect of the invention provides an arrangement which is particularly suited for use in a high definition linear sensor array.

Thus in embodiments of the invention, the second sensor array comprises a plurality of elongate parallel, resiliently deflectable members whose longitudinal direction extends in the direction of travel; each deflectable member being provided with a respective actuating portion which extends downwardly from a head to a part which engages the deflectable member; each deflectable member being provided with at least two sensing portions spaced along its length, each sensing portion having electrical properties which vary in accordance with applied stress; and wherein the sensing portions on a deflectable member are connected electrically as nodes in a bridge arrangement and means are provided for providing an electrical input to the bridge and for detecting an electrical output from the bridge.

There could be two portions of sensing material, connected in a half bridge arrangement, or four portions of sensing material connected in a full Wheatstone bridge arrangement.

This arrangement may be used independently of the first and second aspects of the invention, and thus viewed from a third aspect, the invention provides apparatus for checking characteristics of a vehicle tyre whilst being moved over the apparatus in a direction of travel, comprising a laterally extending linear sensor array to provide outputs indicative of loads at points along a line across the tyre whilst the tyre is moved over the apparatus in the direction of travel, wherein the sensor array comprises a plurality of elongate parallel, resiliently deflectable members whose longitudinal direction extends in the direction of travel; each deflectable member being provided with a respective actuating portion which extends downwardly from a head to a part which engages the deflectable member; each deflectable member being provided with at least two sensing portions spaced along its length, each sensing portion having electrical properties which vary in accordance with applied stress; and wherein the sensing portions of a deflectable member are connected electrically as nodes in a bridge arrangement and means are provided for providing an electrical input to the bridge and for detecting an electrical output from the bridge.

This aspect may also be expressed as a method, and as a linear array for use in such apparatus. Features of this aspect may be used in conjunction with features and optional features of either or both of the first and second aspects of the invention.

The deflectable members could be mounted in cantilever fashion, with one end supported and the other free to deflect. In such an arrangement, the actuating portion may engage the deflectable member adjacent the free end. In a preferred arrangement, however, the deflectable member is supported at both ends and the actuating portion engages the deflectable member in a central region, intermediate its ends. A preferred embodiment of the first, second and third aspects of the invention uses such an arrangement and provides an effective manner of creating the deflectable elements. In accordance with this embodiment, an elongate substrate of a resiliently deformable material is provided with a plurality of parallel, laterally extending slots in the substrate which are spaced from each other in the longitudinal direction so that between any adjacent pair of slots there is defined an elongate deflectable member having first and second ends which are integrally connected to the remainder of the substrate.

A similar arrangement could be used to provide cantilevered deflectable members. In such an embodiment an elongate substrate of a resiliently deformable material is provided with a plurality of parallel, laterally extending slots in the substrate which extend from an edge of the substrate and are spaced from each other in the longitudinal direction so that between any adjacent pair of slots there is defined an elongate deflectable member having a first end which is integrally connected to the remainder of the substrate, and a second, free end.

Such arrangements are of advantage regardless of the particular means for providing an output in response to deflection, and independently of the first, second and third aspects of the invention. Thus, in accordance with a fourth aspect of the invention there is provided apparatus for checking characteristics of a vehicle tyre whilst being moved over the apparatus in a direction of travel, comprising a laterally extending linear sensor array to provide outputs indicative of loads at points along a line across the tyre whilst the tyre is moved over the apparatus in the direction of travel, wherein the sensor array comprises a plurality of elongate parallel, resiliently deflectable members whose longitudinal direction extends in the direction of travel; each deflectable member being provided with a respective actuating portion which extends downwardly from a head to a part which engages the deflectable member; each deflectable member being provided with at least one sensing portion mounted thereon having electrical properties which vary in accordance with deflection of the member; and wherein an elongate substrate of a resiliently deformable material is provided with a plurality of parallel, laterally extending slots in the substrate which are spaced from each other in the longitudinal direction so that between any adjacent pair of slots there is defined a said elongate deflectable member with at least one end thereof being integrally connected to the remainder of the substrate.

Features of this aspect may be used in conjunction with features and optional features of all of the preceding three aspects of the invention; or in conjunction with features of any one of such aspects; or in conjunction with features of any two of such aspects.

The sensing portion or portions used in the preceding aspects of the invention could be, for example, piezo-electric or piezo-resistive elements.

A further area of the invention concerns protection of the sensors used in the second sensor array of the first aspect of the invention, or the sensor array of the second, third and fourth aspects of the invention.

Typically, apparatus in accordance with the aspects of the invention described above will be subject to fairly arduous operating conditions, being positioned in the open air and being driven over repeatedly by vehicles as large and as heavy as lorries, buses and so forth. In WO 2006/003467 a flexible tape is used to cover the sensors, and it is stated that this outer layer needs to protect the sensors against the environmental conditions and to resist wear, but must also allow transmission of the tyre pressure to each sensor element. It is also stated that there must be no cross-talk, so that the pressure as seen at any one sensor is due to the pressure applied over that sensor's area and is not affected by the pressure applied to an adjacent or near sensor.

It has now been ascertained that it is possible to use an outer covering which is much less flexible than a tape, and provides greater protection, whilst still enabling sufficient resolution by the sensor array.

In preferred embodiments of the preceding aspects of the invention, therefore, there is a laterally extending linear sensor array over which the tyre is to roll, the sensor array comprising a plurality of individual force sensors, wherein each force sensor comprises a sensing portion and an actuating portion, the actuating portion having a first end for receiving load from contact with the tyre and a second end for transmitting the tyre contact force to the sensing portion; the sensor array is of sufficiently high resolution to detect points along said line where there is no contact with the tyre as a result of a tread pattern in the tyre; and wherein a cover sheet having an upper surface and a lower surface overlies the first ends of the actuating portions, with the upper surface to be in contact with the tyre and lower surface arranged to transmit loads to the first ends of the actuating portions, the cover sheet being sufficiently rigid to be substantially self-supporting whilst being deformable locally in a resilient manner to permit individual movement of actuating portions in response to the load from a tyre above the upper surface of the cover sheet.

This feature can also be used independently of the earlier aspects of the invention, and thus viewed from a fifth aspect, the invention provides apparatus for use in measuring a characteristic of a tyre on a vehicle wheel, comprising: a laterally extending linear sensor array over which the tyre is to roll in a longitudinal direction with the sensor array extending across the footprint of the tyre; the sensor array comprising a plurality of individual force sensors which provide outputs related to tyre contact load at points on a line extending laterally across the tyre footprint; and a sampling system for sampling the outputs of the force sensors at intervals as the footprint of the tyre moves over the sensor array; wherein each force sensor comprises a sensing portion and an actuating portion, the actuating portion having a first end for receiving load from contact with the tyre and a second end for transmitting the tyre contact force to the sensing portion; the sensor array is of sufficiently high resolution to detect points along said line where there is no contact with the tyre as a result of a tread pattern in the tyre; and wherein a cover sheet having an upper surface and a lower surface overlies the first ends of the actuating portions, with the lower surface arranged to transmit loads to the first ends of the actuating portions, the cover sheet being sufficiently rigid to be substantially self-supporting whilst being deformable locally in a resilient manner to permit individual movement of actuating portions in response to the load from a tyre above the upper surface of the cover sheet.

This aspect may also be expressed in the form of a method. Features of the aspect may also be used in combination with any or all of the features of the preceding aspects of the invention discussed above.

Preferably, the cover sheet is also substantially resistant to compression. However, in some embodiments an incompressible cover sheet could also be provided with a layer of a resiliently compressible material such as rubber, between the cover sheet and the first ends, or heads, of the actuating portions.

The cover sheet may be in the form of a layer of metal such as steel, and in a preferred embodiment may be stainless steel. Alternatively, the cover sheet may be formed of a plastics material. In either case, the sheet may have a thickness of about 0.5 mm, for example. Possible thicknesses for the cover sheet in some preferred embodiments of the invention are: between about 0.3 mm and about 1 mm; between about 0.3 mm and about 0.8 mm; or between about 0.4 mm and about 0.6 mm.

A cover sheet of the above type will protect the apparatus against the ingress of water, dirt and other contaminants, whilst still permitting the use of high resolution sensors which can detect tread gaps.

The feature of a cover sheet may be expressed in alternative ways, both in relation to this fifth aspect of the invention and in relation to embodiments of the preceding four aspects of the invention.

As expressed above, the cover sheet is sufficiently rigid to be substantially self-supporting whilst being deformable locally in a resilient manner to permit individual movement of actuating portions in response to the load from a tyre above the upper surface of the cover sheet. Alternative, or additional, features for defining the cover sheet could be: (i) the cover sheet is metallic and at least 0.3 mm thick; or (ii) the cover sheet undergoes no substantial compression under the weight of a tyre on a vehicle, but flexes resiliently.

In embodiments of this and other aspects of the invention, the extent of movement of the actuating portion corresponding to maximum load for an individual sensor portion may be, for example: in the range of about 10 microns to about 30 microns; in the range of about 10 microns to about 20 microns; in the range of about 15 microns to about 20 microns; no more than about 30 microns; no more than about 25 microns; or no more than about 20 microns. The maximum load on an individual sensor may be, for example: between about 15 kg and about 25 kg; no less than about 15 kg; or no less than about 20 kg. The maximum load on an individual sensor could be significantly more than 20 Kg, for example in the case of aircraft tyres or earth moving vehicles.

The cover sheet may be such as to smooth out signals from adjacent sensors. Without any connection across sensors, if one sensor is aligned with tyre rubber, and the next sensor is wholly aligned with a tread gap, there is no indication as to where the tread gap starts. Processing data from the sensors will lead to a conclusion that the tread gap starts immediately after the first sensor, with a sharp transition. For some purposes, this can affect the usability of the data and less sharp transitions are desired.

The cover sheet serves to transfer a portion of the load on a given sensor to adjacent sensors. This effect can also be obtained by linking together actuating portions for individual sensors directly by suitable links.

Viewed from a sixth aspect, the invention provides apparatus for use in measuring a characteristic of a tyre on a vehicle wheel, comprising: a laterally extending linear sensor array over which the tyre is to roll in a longitudinal direction with the sensor array extending across the entire footprint of the tyre; the sensor array comprising a plurality of individual force sensors which provide outputs related to tyre contact force at points across a line of contact between the tyre and the sensor array; and a sampling system for sampling the outputs of the force sensors at intervals as the footprint of the tyre moves over the sensor array; wherein each force sensor comprises a force sensitive portion and a force transmitting portion, the force transmitting portion having a first end for receiving the tyre contact force and a second end for transmitting the tyre contact force to the force sensitive portion; wherein a laterally extending flexible force distribution member overlies the force transmitting portions in contact with the second ends thereof, so as to be between the tyre and the force transmitting portions in use, whereby a portion of the force exerted by the tyre on a given force transmitting portion is distributed to adjacent force transmitting portions.

The force distribution member may be a portion formed integrally with a plurality of force transmitting portions. The force distribution member may comprise a cover sheet and may be a layer of metal or plastics material. The force distribution member may comprise a relatively rigid layer and a relatively flexible layer of resilient material. The force distribution member may be sufficiently rigid to be substantially self-supporting but sufficiently flexible to permit individual movement of adjacent force transmitting portions, and may be as described in the context of the preceding aspects of the invention.

This sixth aspect of the invention may be expressed as a method and may also be combined with features and optional features from any of the other aspects of the invention.

Another aspect of the invention concerns determining the sensor data to be used in determining tyre pressure, when using a laterally extending array of sensors over which the tyre passes. The sensor outputs will be sampled as the tyre passes over the sensor array, and in general terms it has been assumed that the detected load will increase to a plateau from a minimum when the tyre first contacts a sensor, and then decrease until the tyre has passed over the array. The sensors providing the highest outputs will normally be those which are fully in contact with the tyre, and the readings from sensors towards the centre of the tyre, away from effects near the sidewalls, will provide the most reliable data for use in determining tyre pressure.

It has been determined that there is an initial peak when a portion of a tyre first engages the sensor array. There is then an approximate plateau after the peak, until the load starts decreasing again. In U.S. Pat. No. 5,942,681 there are illustrated three curves of the load/time for a tyre. Each of these shows such an initial peak and it is stated that these maxima on the curves are used in calculations. It has now been found that the peaks are unstable and that their amplitudes can vary for a number of reasons which are unrelated to tyre inflation pressure. In accordance with another aspect of the invention the data used in determining tyre pressure is taken from the plateau region instead, where the data is more stable and more reliable.

Thus, viewed from a seventh aspect of the invention there is provided a method of checking the pressure of a vehicle tyre whilst being moved over apparatus in a direction of travel, comprising providing a laterally extending linear array of sensors to provide outputs indicative of loads at points along a line across the tyre whilst the tyre is moved over the apparatus in the direction of travel, and sampling the outputs of the sensors at intervals as the tyre is moved over, in which as the tyre moves over the sensor array the load on a sensor increases from zero or a minimum to a peak, and subsequently decreases to a plateau and then to zero or the minimum, and in which the outputs of a sensor which are used in checking tyre pressure are only those taken in a time interval which commences after the load has subsided from the peak to the plateau, and which terminate before the load commences decreasing from the plateau.

The plateau need not be completely flat and may have variations in output amplitude, or even a trend in a direction— upwards or downwards. However, it is distinct from what will normally be a steep increase to the peak initially, a steep descent from the peak, and a steep ultimate descent, and is significantly more constant. In some embodiments, the time interval in respect of which outputs are used, commences at a point which is substantially closer in time to the point at which the load commences decreasing from the plateau, than it is to the peak. In some embodiments, the extent of the time interval in respect of which outputs are used, is substantially less than the time for which the tyre imparts a load on the sensor.

When a tyre moves over a linear array, there is a single line of contact between the array and the tyre, whose position in the tyre footprint changes from being at the front of the footprint to being at the rear of the footprint. To check tyre pressure, in some embodiments of this aspect of the invention, sensor outputs are used only in respect of: no more than about the rearmost 75% of the length of the tyre footprint; no more than about the rearmost 65% of the length of the tyre footprint; no more than about the rearmost 50% of the length of the tyre footprint; or no more than about the rearmost 30% of the length of the tyre footprint. Put another way, sensor outputs are used only in respect of: no more than about the final 75% of the total time for which outputs are produced; no more than about the final 65% of the total time for which outputs are produced; no more than about the final 50% of the total time for which outputs are produced; or no more than about the final 30% of the total time for which outputs are produced.

In embodiments in which the tyre pressure is checked by reference to stored comparative data, this aspect of the invention provides greater reliability as the sensor outputs in the chosen interval of time are more consistent and thus there will be more accurate correlation with outputs provided during a calibration phase, for example.

This aspect of the invention may also be expressed in the form of apparatus configured to carry our the invention. Features of this aspect of the invention may also be used in conjunction with features and optional features of any or all of the other aspects of the invention discussed earlier.

In some embodiments of this seventh aspect of the invention, the appropriate sensor outputs to be used can be calculated by using an algorithm which checks for the initial peak, and then waits for an appropriate time, or which checks for the plateau and chooses an appropriate point on that plateau. In some embodiments, in which there is a first sensor array to detect the load distribution over a base carrying a platform on which the linear array is provided, the first set of sensors can be used to determine the tyre position and speed, and that information can be used to identify the appropriate sensor outputs to use from the sensors in the linear array. In such an embodiment, readings from the first sensors can be used to initiate sampling of the outputs from the second set of sensors, and to terminate sampling. Alternatively, the outputs from the first set of sensors can be used to determine a time interval over which the outputs from the second sensors are to be used, and sampled outputs within this time interval can be selected.

As regards the position of the sensors whose outputs are used, these can for example be limited to those in a central region of the tyre footprint, away from the tyre edges. These can be selected from analysing the data from the sensors in the linear array to identify the edges of the tyre footprint and the tyre width, and to chose sensors in the central region. Alternatively, the first set of sensors can be used to identify the approximate boundaries of the tyre and that information used to identify sensors in the second set whose outputs are to be used. In general, these possibilities can be combined, and sensors in the second set can be chosen having regard to outputs from the sensors in the second set, and to outputs from sensors in the first set.

As noted above, the sensors chosen for tyre pressure measurement are preferably taken from a central region of the tyre, away from the tyre sidewalls. This central region may be, for example, disposed symmetrically or approximately symmetrically either side of the centre line of the tyre, and may occupy for example: up to about 10% of the width of the tyre footprint; up to about 15% of the width of the tyre footprint; up to about 20% of the width of the tyre footprint; up to about 25% of the width of the tyre footprint; up to about 30% of the width of the tyre footprint; up to about 35% of the width of the tyre footprint; up to about 40% of the width of the tyre footprint; up to about 45% of the width of the tyre footprint; up to about 50% of the width of the tyre footprint; up to about 55% of the width of the tyre footprint; up to about 60% of the width of the tyre footprint; up to about 65% of the width of the tyre footprint; up to about 70% of the width of the tyre footprint; or up to about 75% of the width of the tyre footprint. Put another way, the central region may be disposed symmetrically or approximately symmetrically either side of the centre line of the line of contact between the sensor array and the tyre, and may occupy, for example, up to about 10% of the length of the line of contact between the array of sensors and the tyre; up to about 15% of the length of the line of contact between the array of sensors and the tyre; up to about 20% of the length of the line of contact between the array of sensors and the tyre; up to about 25% of the length of the line of contact between the array of sensors and the tyre; up to about 30% of the length of the line of contact between the array of sensors and the tyre; up to about 35% of the length of the line of contact between the array of sensors and the tyre; up to about 40% of the length of the line of contact between the array of sensors and the tyre; up to about 45% of the length of the line of contact between the array of sensors and the tyre; up to about 50% of the length of the line of contact between the array of sensors and the tyre; up to about 55% of the length of the line of contact between the array of sensors and the tyre; up to about 60% of the length of the line of contact between the array of sensors and the tyre; up to about 65% of the length of the line of contact between the array of sensors and the tyre; up to about 70% of the length of the line of contact between the array of sensors and the tyre; or up to about 75% of the length of the line of contact between the array of sensors and the tyre.

From the outputs from sensors in the central region, and over the period of time chosen to coincide with the desired part of the plateau, the largest output could be chosen, as representing the load on a single sensor that is fully in contact with the tyre. However, there could be reasons why this is not an accurate representation of the true load, for example if the sensor coincides with the position of a stone in a tyre tread gap. Preferably, therefore, the outputs from a number of sensors with the highest values are chosen, these then excluding outputs from sensors coinciding wholly or partly with tread gaps. For example, there could be chosen: up to the top 5% of outputs; up to the top 10% of outputs; up to the top 15% of outputs; up to the top 20% of outputs; up to the top 25% of outputs; up to the top 30% of outputs; up to the top 35% of outputs; up to the top 40% of outputs; up to the top 45% of outputs; or up to the top 50% of outputs. Statistical techniques could be used to exclude any anomalies, for example particularly high values or particularly low values. The average value could be calculated from the remaining outputs.

The intention in such embodiments of aspects of the invention is to obtain a reliable value for the load on a sensor that is fully in aligned with tyre rubber, without the effects of tread gaps, away form transient effects towards the edges of the tyre, and in a stable plateau region of the load profile as the tyre rolls over the sensor array.

In terms of the structure of apparatus for use in implementing the various aspects of the invention discussed above, in embodiments using a linear sensor array with a plurality of actuating portions engaging sensing portions, as described earlier there may be provided a support structure having spaced, parallel, vertically extending slots which are aligned with the sensing portions, each slot guiding a respective actuating portion. Such a structure can used in other circumstances where load analysis is required.

Viewed from an eighth aspect, the invention provides an elongate sensor array, comprising a support member; an elongate substrate mounted on the support member, the substrate being of a resiliently deformable material and provided with a plurality of parallel, laterally extending slots in the substrate which are spaced from each other in the longitudinal direction so that between any adjacent pair of slots there is defined an elongate deflectable member with at least one end thereof being integrally connected to the remainder of the substrate; at least one sensor provided on each deflectable member which has electrical properties which vary in accordance with deflection of the member; a plurality of actuating portions which are aligned with the deflectable members, each actuating portion having a head end remote from the substrate and a base end which engages a respective deflectable member; and a cover sheet of resiliently deformable material overlying the head ends of the actuating portions.

In a preferred arrangement, an elongate support structure overlies the substrate and has spaced, parallel, vertically extending slots which guide the actuating portions.

Such an array of sensors can be used in a number of applications where a linearly extending array is required, and is of particular use in providing a high resolution array of sensors, in terms of providing high resolution along the elongate direction of the substrate, by having the slots closely spaced and narrow, and also having the heads of the actuating portions narrow. The resolution in the lateral direction can be altered by choosing the size of the head of the actuating portions. A head which is square, with the side dimension equivalent to the width of a deflectable member, will provide the same resolution laterally as longitudinally. A head which is elongated in the lateral direction will provide lower resolution in that direction.

Features of this aspect of the invention may also be used in conjunction with features or optional features of any or all of the other aspects of the invention discussed earlier. In the context of the methods and apparatus used to determine vehicle tyre characteristics, the sensor array will be arranged with the longitudinal dimension of the array extending perpendicularly across the intended direction of movement of a tyre over the array.

As noted above, the various aspects of the invention can be used together in various combinations. Without prejudice to the generality of the numbers of combinations and sub-combinations that are possible, the following is an example of combinations starting from one particular aspect. This particular aspect of the invention provides apparatus for checking the inflation pressure of a vehicle tyre whilst being moved over the apparatus in a direction of travel, comprising a base; a platform which is mounted over the base and which is of sufficient extent in the direction of travel and laterally of the direction of travel to accommodate the entire footprint of a vehicle tyre; a first array of first load sensors arranged between the platform and the base, for providing data indicative of varying loads exerted on the base by the platform at points distributed longitudinally and laterally over the base, whilst the tyre is moved over the platform in the direction of travel; means for sampling the outputs of the first load sensors; a second array of second sensors mounted on an upper surface of the platform and extending across the platform, the array having a lateral extent sufficient to accommodate the width of a vehicle tyre, each of the second sensors being a load sensor which provides varying outputs indicative of the value of the load on the sensor whilst the tyre is moved over the platform in the direction of travel; means for sampling the outputs of the second sensors; and data processing means configured to process the data obtained from sampling the outputs of the first and the second sensors; the data processing means being configured to provide at least one representative second sensor load value and to provide an indication of the inflation pressure of the tyre using the representative second sensor load value.

The first array of first load sensors may comprise a plurality of laterally extending rows of sensors. There may be a first row of sensors adjacent a front edge of the platform, and a second row of sensors adjacent a rear edge of the platform. There may be at least one additional row of sensors between the first and second rows. The first array of first load sensors may comprise a plurality of columns of sensors. There may be a first column of sensors adjacent a left edge of the platform, and a second column of sensors adjacent a right edge of the platform. There may be at least one additional column of sensors between the first and second columns.

The second array of second sensors may be a linear array extending across the platform. The second sensors may be constructed and arranged such that the second array can distinguish portions on a tyre surface where there are tread gaps. Each second sensor may be associated with a respective actuating portion whose width is sufficiently small to enable the width to be aligned completely within the width of a tread gap of a tyre on the platform. Each actuating portion may be elongate and extend in the direction of travel by a sufficient extent to bridge laterally extending tread gaps adjacent an edge of the tyre, whilst permitting the actuating portion to be aligned completely within a tread gap in a central region of the tyre.

The actuating portions associated with the second sensors may be in engagement with the lower surface of a cover sheet whose upper surface is to be engaged by the tyre, the cover being sufficiently rigid to be substantially self-supporting whilst being deformable locally in a resilient manner to permit individual movement of actuating portions in response to the load from a tyre above the upper surface of the cover sheet. The cover sheet may serve to distribute to adjacent force transmitting portions, a proportion of the force exerted by the tyre on a given force transmitting portion. The cover sheet may be metallic with a thickness of at least 0.3 mm.

The sensor array may comprise a plurality of elongate parallel, resiliently deflectable members whose longitudinal direction extends in the direction of travel, each deflectable member being provided with a said actuating portion which extends downwardly from a head to a part which engages the deflectable member, and each deflectable member being provided with at least one sensing portion mounted thereon having electrical properties which vary in accordance with deflection of the member. An elongate substrate of a resiliently deformable material may be provided with a plurality of parallel, laterally extending slots in the substrate which are spaced from each other in the longitudinal direction so that between any adjacent pair of slots there is defined a said elongate deflectable member with at least one end thereof being integrally connected to the remainder of the substrate. Each deflectable member may be provided with at least two sensing portions mounted thereon having electrical properties which vary in accordance with deflection of the member, the sensing portions being connected electrically in a bridge arrangement.

There may be provided a method of checking the inflation pressure of a vehicle tyre whilst being moved in said direction of travel over apparatus as set out in the preceding paragraphs, comprising the steps of sampling the outputs of the first load sensors, sampling the outputs of the second sensors, processing the data obtained from sampling the outputs of the first and the second sensors to provide at least one representative second sensor load value, and to providing an indication of the inflation pressure of the tyre using the representative second sensor load value.

The method may comprise the step of processing the data obtained from sampling the outputs of the first sensors in order to obtain a value representative of the total load borne by the platform. The method may comprises the step of processing the data obtained from sampling the outputs of the first sensors in order to obtain data representative of the direction of travel of the tyre over the platform, and/or the speed of travel of the tyre over the platform and/or the tracking angle of the vehicle tyre. The method may comprises the step of processing the data obtained from sampling the outputs of the second sensors in order to obtain data representative of any camber effects, in which there is a variation of load from one side of the tyre to the other. Such camber can be positive or negative.

The method may comprise the step of processing the data obtained from sampling the outputs of the first sensor in order to obtain data representative of a time interval during which data obtained from sampling the outputs of the second sensors is to be used to provide said at least one representative second sensor load value. Sampling the outputs of the second sensors may be initiated at the start of said time interval and terminated at the end of said time interval. The start of the time interval may occur when loads on the second sensors have dropped from an initial peak after the tyre has contacted the second array, to a plateau region; and the end of said time interval may occur before loads on the second sensors start to drop from said plateau region.

The method may be such that as the tyre moves over the platform, the load on sensors in the second set of sensors increases relatively steeply to a peak, subsequently decreases to a relatively level plateau for a period of time and then decreases relatively steeply; and wherein the outputs of sensors in the second set which are used in determining the tyre pressure are only those provided in a time interval which commences after the load has subsided from the peak to the plateau, and which terminate before the load commences decreasing from the plateau.

The method, and methods in accordance with other aspects of the invention, may include investigating tyre wear by checking for variations in the width of the tyre footprint over which there are tread gaps. When a tyre is new, there will be tread gaps across the width of the tyre. As the tyre wears, treads towards the outside edges of the tyre will be worn down first and will eventually disappear. Thus, by storing the data for a particular tyre, it is possible to track the wear pattern.

Viewed from a further aspect of the invention, there is provided apparatus for checking the inflation pressure of a vehicle tyre whilst being moved over the apparatus in a direction of travel, comprising a platform which is mounted over the base and which is of sufficient extent in the direction of travel and laterally of the direction of travel to accommodate the entire footprint of a vehicle tyre; an array of sensors mounted on an upper surface of the platform and extending across the platform, the array having a lateral extent sufficient to accommodate the width of a vehicle tyre, each of the sensors being a load sensor which provides varying outputs indicative of the value of the load on the sensor whilst the tyre is moved over the platform in the direction of travel; means for sampling the outputs of the sensors; and data processing means configured to process the data obtained from sampling the outputs of the sensors, to provide at least one representative sensor load value, and to provide an indication of the inflation pressure of the tyre using the representative sensor load value; wherein each sensor is associated with a respective actuating portion whose width is sufficiently small to enable the width to be aligned completely within the width of a tread gap of a tyre on the platform; and each actuating portion is in engagement with the lower surface of a cover sheet whose upper surface is to be engaged by the tyre, the cover being sufficiently rigid to be substantially self-supporting whilst being deformable locally in a resilient manner to permit individual movement of actuating portions in response to the load from a tyre above the upper surface of the cover sheet.

Some embodiments of the various aspects of the invention will now be described by way of example and with reference to the accompanying drawings, in which:

BRIEF DESCRIPTION OF DRAWINGS

FIG. 15 is top view showing the cover sheet;

FIG. 16 is a schematic view of a vehicle tyre passing over the sensor array;

FIG. 17 is a diagram of a tyre footprint output using the arrangement in FIG. 16;

FIG. 18 is a diagram of an alternative tyre footprint output using the arrangement in FIG. 16 but with different sensors;

FIG. 19 is an alternative embodiment for providing actuating portions;

FIG. 20 is an alternative embodiment using a different actuating portion;

MODES FOR CARRYING OUT INVENTION

Figure 1:
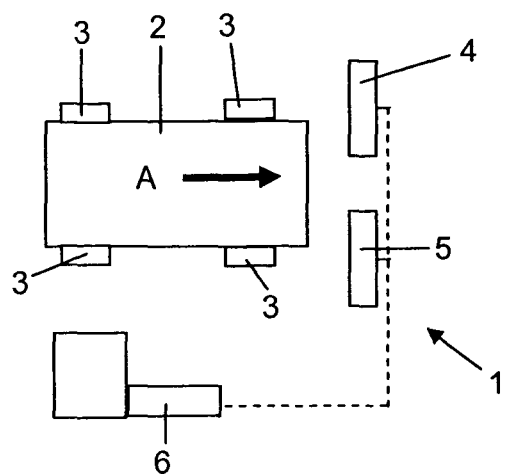
FIG. 1 is a diagrammatic view of a system used to measure tyre characteristics.

Referring now to FIG. 1, a system 1 is used to determine tyre characteristics for a vehicle 2 having four wheels 3, moving in the direction of arrow A. The system includes two sets of sensor apparatus, namely apparatus 4 for the left hand wheels of the vehicle and apparatus 5 for the right hand side. These are identical and are linked to a data processing unit 6.

Figure 2:
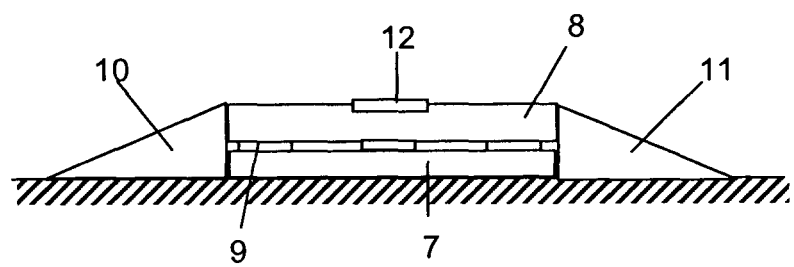
FIG. 2 is a diagrammatic end view of sensor apparatus used in the system.
Figure 3:
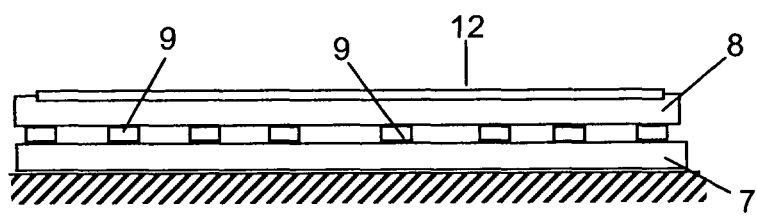
FIG. 3 is a diagrammatic front view of the main portion of the apparatus.
Figure 4:
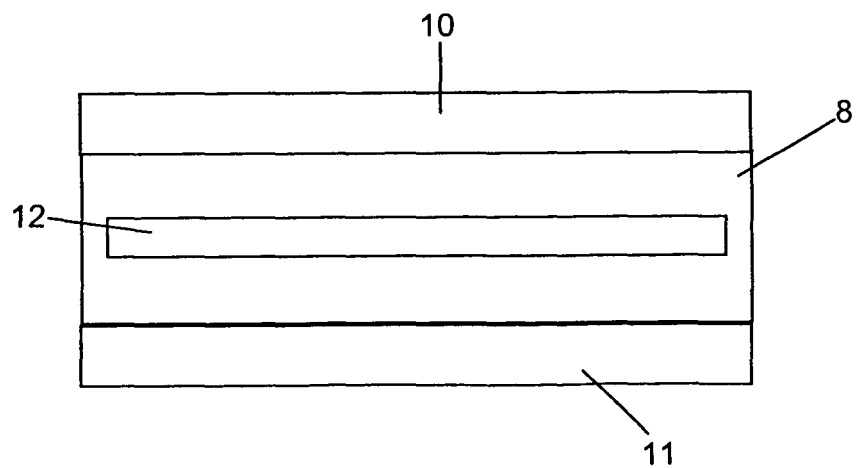
FIG. 4 is a top view of the apparatus.
Figure 5:
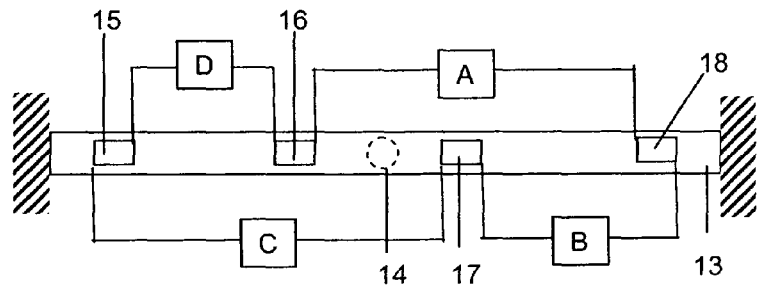
FIG. 5 is a schematic top view of an individual sensor used in the apparatus.
Figure 6:
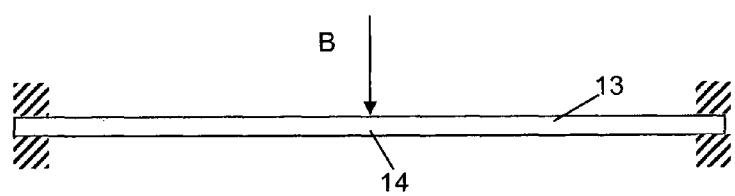
FIG. 6 is a schematic side view of the sensor.
Figure 7:
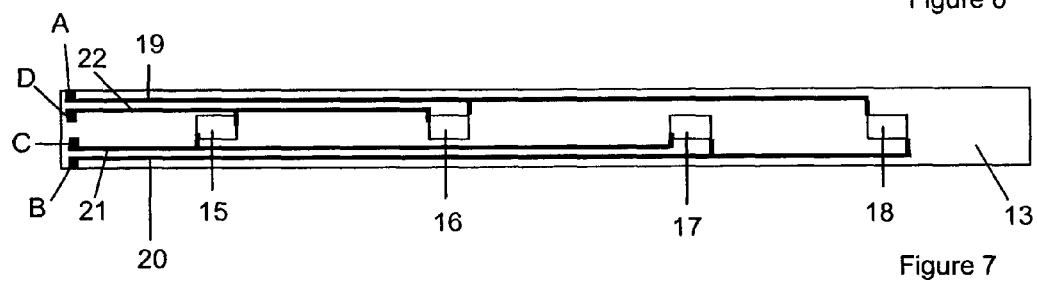
FIG. 7 is a top view of the sensor showing electrical connections.

As shown in FIGS. 2, 3 and 4, the sensor apparatus includes a base 7 on which is supported a platform 8 through a matrix of first load sensors 9 arranged in three rows of eight. A leading edge ramp 10 and a trailing edge 11 are provided. A lateral array 12 of second sensors is mounted in the platform 8 in a central position. In use a tyre 3 will roll up ramp 10 and pass onto the platform 8, causing outputs from the first sensors 9 until the tyre passes down the ramp 11. Whilst rolling over the platform 8, the tyre passes over the laterally extending linear array 12 of sensors. The outputs from the first sensors 9 are sampled at intervals and used to determine, amongst other things, the total load on the apparatus from the wheel 3. The outputs from the array 12 of sensors are sampled at intervals and used to determine, amongst other things, the inflation pressure of the tyre 3.

Figure 8:
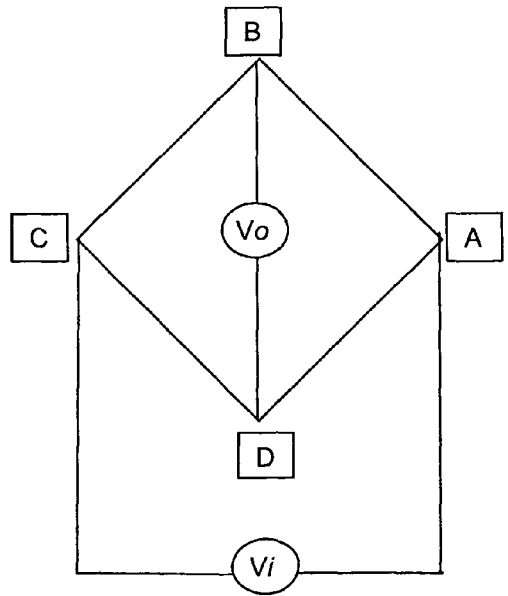
FIG. 8 is a diagram of a bridge circuitry for use with the sensor.

With reference to FIGS. 5 to 8, each sensor in the array 12 comprises a beam 13 which is supported at both ends and can be deflected resiliently under the action of a downwardly applied force at a mid point 14, in the direction of arrow B. Spaced at intervals along the beam 13 are four piezo-resistive elements 15, 16, 17 and 18, in the form of thick film portions printed on the beam 13. Each of these has two connections and these are joined in pairs as shown schematically on FIG. 5, to provide four connection points A, B, C and D. This can be done by means of conductive portions 19, 20, 21 and 22, printed on the beam 13, as shown on FIG. 7. The connection points A, B, C and D form the nodes of a Wheatstone Bridge as shown in FIG. 8, with the input voltage Vi being applied across nodes A and C and the output signal Vo being provided across nodes B and D. This output signal Vo varies in amplitude in accordance with the deflection of the beam 13, and is therefore dependent on the applied load at point 14.

Figure 9:
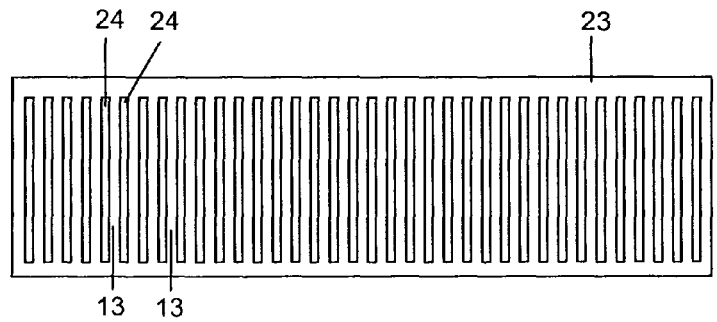
FIG. 9 is a plan view of a substrate for forming a plurality of the sensors.

To produce the linear array 12, a substrate sheet 23 is used as shown in FIG. 9. The sheet may be of any suitable material such as stainless steel, coated in a dielectric material. A number of parallel, equally spaced slots 24 are cut into the substrate, for example using a laser cutter, to define the individual parallel beams 13.

Figure 10:
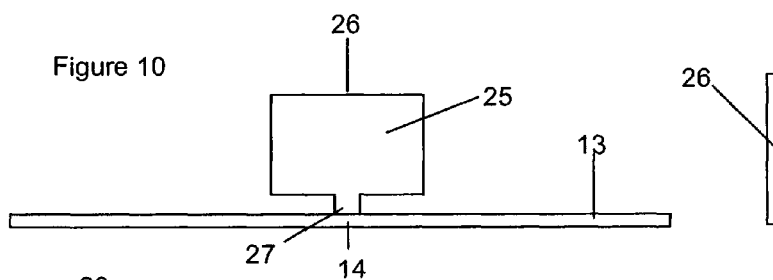
FIG. 10 is a side view showing an actuating portion for the sensor.
Figure 11:
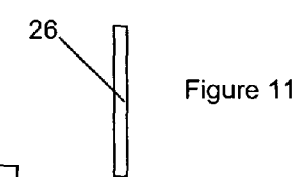
FIG. 11 is a top view of the actuating portion.

To deflect the beams, a corresponding series of actuators 25 are used, as shown in FIG. 10. Each of these is of generally rectangular form, to provide an elongate rectangular head 26 at the upper end. At the lower end there is a foot 27 of much smaller size than the head, which engages the mid point 14 of the beam 13. The purpose of the elongate head will be discussed below.

Figure 12:
FIG. 12 is a top view of a block for guiding the actuating portions.
Figure 13:
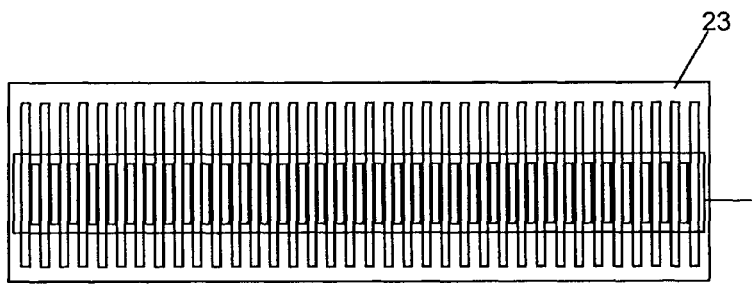
FIG. 13 is a plan view showing the block positioned over the substrate.
Figure 14:
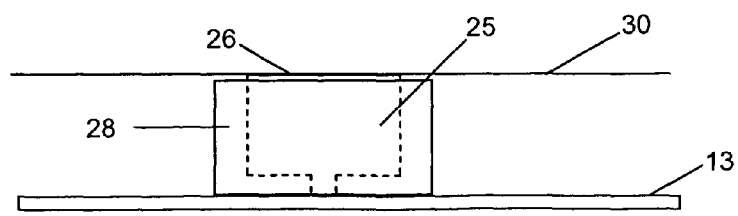
FIG. 14 is a side view showing a cover sheet over the actuating portion.

FIG. 12 shows a support block 28, with a series of spaced, parallel slots 29 which receive the actuators 25. FIG. 13 shows the block 28 positioned over the substrate 23, with the slots 29 aligned with the individual beams 13. FIG. 14 is a side view showing how an actuator 25 is supported in the block 28, with its head 26 projecting above the block and its foot 27 engaging the mid point 14 of the beam 13. A cover sheet 30 of 0.5 mm thick stainless steel is provided over the heads 26 of the actuators 25. This is deformable resiliently to allow loads from a tyre engaging the sheet to be transmitted to the individual actuators 25.

FIG. 15 is a top view of the sensor array assembly with the cover sheet 30 held in place by a peripheral flange 31, which is sealed to the sheet and to adjacent material so that there is provided an effective barrier against the ingress of water, dust and other contaminants into the interior of the assembly.

FIG. 16 shows a diagrammatic view of a tyre 32 passing over an array of sensors as described above, whose actuator heads 26 are represented as an array 33. The array extends laterally of the direction of movement of the tyre as it is rolled over the apparatus. The tyre has two central "zig-zag" tread patterns 34 and 35 cut into it, as well as laterally directed tread gaps 36 and 37 extending inwardly from the edge of the tyre. As can be seen, the elongate heads of the actuators are sufficiently long to bridge a tread gap 36 at one edge of the tyre. However, in the central tread gaps 34 and 35, there are actuator heads which are completely within the tread gaps. In this central region there are also actuator heads that are completely in engagement with the rubber of the tyre.

As the tyre rolls over the array, the contact with the array is always across the same line, but the position of that line in the tyre footprint changes. The data from the sensors in the array can be processed to provide a representation of the outline 38 of the tyre footprint, as shown in FIG. 17. The maximum width of the tyre footprint is the distance between points 39 and 40. However, within the outline of the tyre footprint the tread pattern of the tyre cannot be seen. The tread gaps 34 and 35 have been detected, but only across a single line. The zig-zag nature of the gaps cannot be seen and they are represented only by longitudinal lines 41 and 42. Because the actuator heads span the tread gap 36, this does not show up at all.

FIG. 18 shows the result that would be obtained if using actuator heads that are much shorter than the elongate heads 26 of actuators 25. In this case, the side tread gap would be detected over at least some of its extent. Since it is impossible to resolve this information around the circumference of the tyre, to pick up other points where there is rubber and no gap, the result would be as shown in FIG. 18. The side of the tyre with the tread gap 36 appears to be missing completely and the perceived maximum width of the footprint between points 39 and 40 would be significantly less. This will affect calculations regarding tyre width, footprint profile and area, footprint symmetry and so forth.

FIG. 19 shows a modification of the embodiment described above in which instead of the actuators 25 being individual items they are provided as modules 43 in which a number of the actuators have been moulded integrally with a connecting strip 44 joining the heads. This is sufficiently flexible to allow the actuators to move independently, although as with the cover sheet 26 there is no need for the strip to be as flexible as a tape, for example. The strip could be sufficiently rigid to be self-supporting, whilst still permitting movement of the individual actuators in a manner that provides sufficient resolution. The strip could be as wide as desired, for example as wide as the actuators themselves or, as shown in FIG. 19, relatively narrow.

FIG. 20 illustrates an alternative actuator arrangement for a beam 13. In this an actuator 45 of significantly reduced depth is bonded to a cover sheet 46 which may be identical or similar to cover sheet 26 discussed earlier. The actuators will be spaced at intervals along the sheet 46, so as to overlie their respective beams 13. At the lower end of the actuator 45 is provided a foot 47 which engages the beam 13. An optional guide 48 with appropriate slots may be provided for the actuators.

Figure 21:
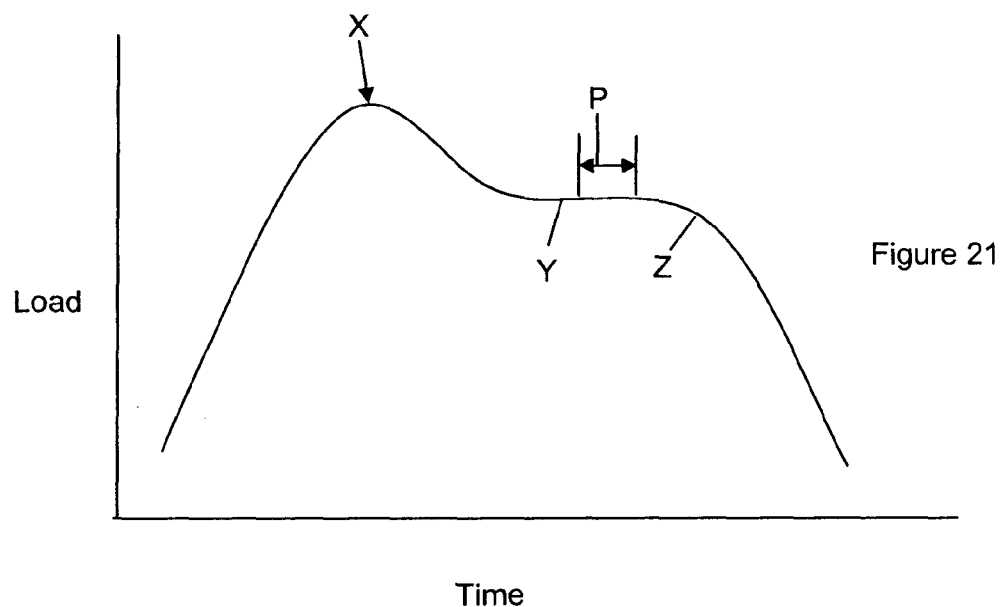
FIG. 21 is a plot of the load on a sensor in the second set as a function of time.

FIG. 21 shows how the load on an individual sensor in the array 12, i.e. beam 13, varies with time as a tyre is rolled over. There is an initial rise to a peak indicated at X, a decrease to a plateau indicated at Y, and then a decrease from point Z. The portion of the plateau where the sensor outputs are used to determine tyre pressure, is marked P. The initial rise to a peak may, for example, occur as a result of the tyre rubber distorting, with there being effects from the nature of the rubber, tyre reinforcements and so forth. The tyre rubber may subsequently relax in the region of the plateau.

Figure 22:
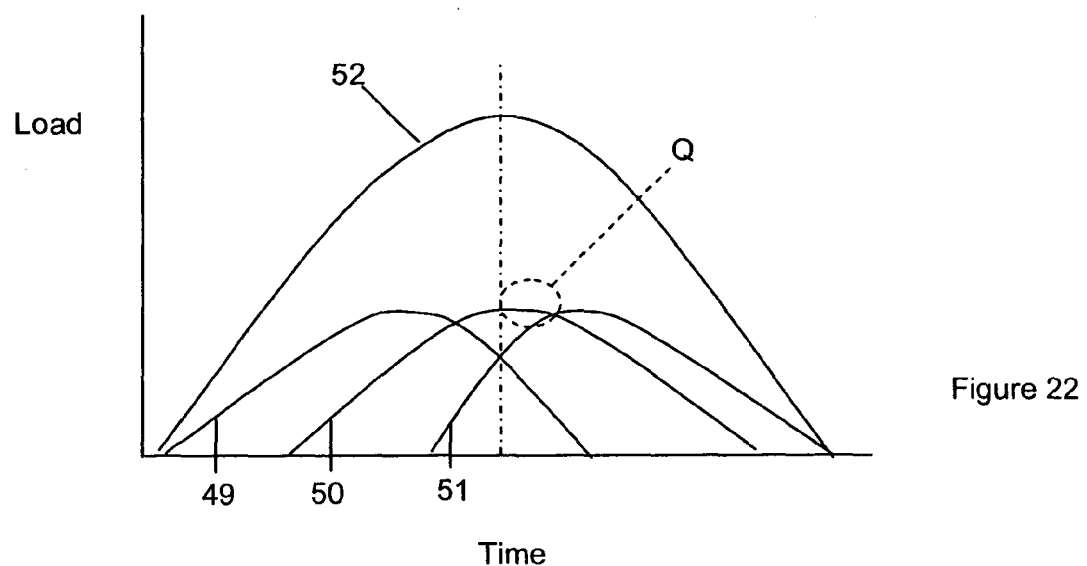
FIG. 22 is a plot of the load output from the second set of sensors, as a function of time.

FIG. 22 shows the variation of the load on sensors 9 between the platform and the base, as the tyre rolls over the apparatus, as a function of time. Left hand lower curve 49 represents the cumulative outputs of the sensors in the first row, central curve 50 represents the cumulative outputs of the sensors in the middle row, and right hand curve 51 represents the cumulative outputs of the sensors in the middle row. The upper curve 52 represents the total load on all of the sensors 9. The region Q represents the time during which outputs from the second set of sensors will be used, extending from when the tyre is centrally on the platform so that it is engaged with the sensor array 12, until before the tyre starts to move off of the platform. The output from the sensors 9 can thus be used to trigger sampling of the outputs from sensor array 12. In this arrangement, the starting time for using the second sensor outputs is approximately the crossover point between the output curves 49 and 51, i.e. the outputs from the first and third rows of sensors. The end of the period used represents the crossover between curves 50 and 51, i.e. the outputs of the middle and third rows. It would be possible to dispense with the third, central row and to use instead the output from the two other rows to determine when to terminate use of the second sensor outputs. It would be possible to use two central rows, one either side of the centre line.

In one method of use, the sensor readings from the array 12 that are used, are those over the selected period of time when the outputs are in the plateau region. The sensors chosen for tyre pressure measurement are taken from a central region of the tyre, away from the tyre sidewalls, and an average is taken of an upper proportion of the output values, with exceptionally high or low values being excluded, this average being used to determine the tyre pressure according to methods discussed earlier. In another method of use, the sensor readings from the array 12 that are used, are also those over the selected period of time when the outputs are in the plateau region. The sensors chosen for tyre pressure measurement are taken from a central region, or a wider region, of the tyre, and all of those sensor outputs are used to determine a lateral profile of the tyre footprint so that over- and under-inflation can be determined from examining this profile. Again, exceptionally high or exceptionally low values could be excluded.

Figure 23:
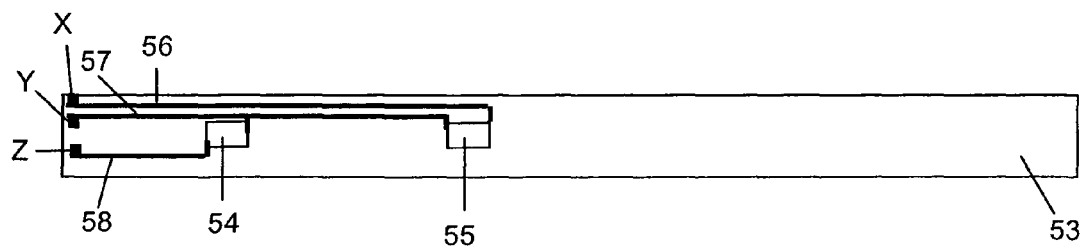
FIG. 23 is a schematic top view of an alternative individual sensor used in the apparatus.
Figure 24:
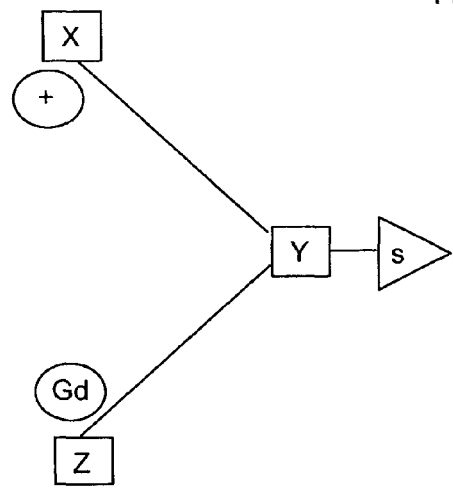
FIG. 24 is a diagram of a alternative bridge circuitry for use with the sensor.

FIG. 23 shows an alternative sensor beam 53 for use in the linear array of sensors. This can be provided in the same way as beam 13 in the previous embodiments. Instead of having four sensing elements, beam 53 is provided with two sensing elements 54 and 55, which are connected to tracks 56, 57 and 58, giving terminals X, Y and Z As shown in FIG. 24, these are used to connect the sensing elements in a half bridge, with the positive supply being connected to terminal X, the ground to terminal Z, and the output signal s being provided from terminal Y.

Figure 25:
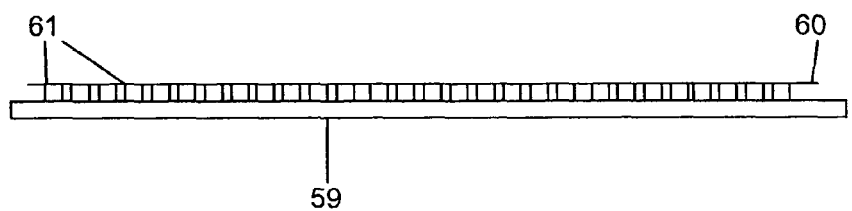
FIG. 25 is a plan view of an alternative substrate for forming a plurality of the sensors.

FIG. 25 shows an alternative arrangement for the second sensor array. In this there is a base 59, for example a steel substrate of 2.5 mm thick. Above this is positioned a stainless steel sheet 60 of 0.5 mm thickness, and between the two are mounted equally spaced sensing elements 61. This provides a compact an simple arrangement which does not require separate actuating portions.

In one embodiment of the invention, the two sets of sensor apparatus 4 and 5 each contains 320 individual pressure sensors, with each pressure sensor comprising a beam 13 and actuator 25 as described above. These are divided into five modules, each having 64 individual sensors. Each sensor module comprises a substrate 23, which is provided with slots 24 defining the 64 individual beams. Each module includes a corresponding number of actuators 25 and a guide block with 64 slots. Alternatively, each module could include two sub-modules, each sub-module having 32 sensors, and an associated guide block and actuators. The beams and the actuators are laid out at a constant 3 mm pitch, and the head of each actuator is 2 mm wide and 20 mm long.

A cover sheet 30 can be provided over each individual module, or a common cover sheet can be provided over all five modules. The modules are provided in an injection moulded case, and the five cases are mounted in recesses in the upper surface of the platform 8. Within the recesses are also provided connecting cables, data acquisition and/or processing boards with appropriate memory and processing power, and interfaces for providing data to other components such as the data processing unit 6, if desired via a local processing unit receiving data from both sets of sensor apparatus 4 and 5.

In operation the outputs from the individual sensors are sampled at, for example, about 8 to 10 k Hz.

Within each module, the individual analogue sensor outputs are transmitted to 2 stage amplifiers, for example arranged in two groups of 32 amplifiers, which send the analogue signals from each sensor to high speed analogue to digital converters, for example four high speed ADC's based in two microcontrollers. Conventional load cells need a DC offset to set the start threshold. This can be achieved with trimmers or via the control of a microcontroller. The present system uses the control via a microcontroller in a different way. Coarse control of offset via a digital to analogue converter under the microcontroller's firmware is handled within the first stage of a DC amplifier, but there is fine control of offset via a second DAC into the second stage amplifier. This two stage system allows for very precise control of trim, which would hinder a conventional load cell system without it. There can thus be provided a temperature stable dynamic zero tare system.

Each module uses a 16 bit high speed parallel data bus with a 4 bit hardware platform side address to select the module. The bus allows a common ribbon cable to connect modules together.

Firmware for the sensor modules controls the DC offset and sends values to each group of 32 sensors. The sensor modules read the tyre forces when a vehicle drives over. This event is triggered by a controller for the apparatus set concerned, which uses the outputs from the first set of sensors to determine the position and direction of tyre movement. Only modules that will have load are read. Once the tyre has passed over, the sensor modules holding data notify the acquisition controller to collect it. The data is collected quickly so that the sensor modules can deal with a following wheel of the vehicle.

The first set of sensors for either set of apparatus 4, 5 may have to handle, for example, a total weight of 5 tons and a dynamic loading of 20 tons. Each sensor can comprise, for example, a 2 mm thick stainless steel substrate with a dielectric coating, on which is provided piezo-resistive thick film material. The base of the apparatus may be metal, such as aluminium, with an optional rubber bottom layer. There are three rows of eight sensors, arranged in a matrix of rows and columns, and these can be used to detect the direction of travel, the tyre rotation position, and the maximum load, so that there can be determined the best positions for the sensors of the second set to collect data.

The modules and at least some of associated electronic circuitry can be accommodated in the platform of the respective set of apparatus 4 or 5. Some of the circuitry can be located in a separate unit which receives data from the two sets of apparatus.

The use of the stainless steel cover sheet not only protects the sensors and circuitry, it can also serve to smooth out some of the outputs, and in particular can smooth out data where there is an edge of a tread gap. In other cases, however, smoothing may avoided as it may be desired to be able to analyse the data adjacent a tread gap, as this may be an indicator of tread wear. When a tyre is new, there is a relatively sharp transition from the rubber surface to a tread gap. As the tread wears down, the transition can become smoother, and the transition can thus be analysed to provide an indication of tread wear.

As noted above, the tyre inflation pressure can be expressed as:

$$P = aF_s + b \quad (1)$$

Where P is the inflation pressure, $F_s$ is the load on an individual sensing element in the second set of sensors, i.e. those carried by the platform, a is a constant and b is a constant. The values of the constants can be determined by experiment, using maximum and minimum inflation pressures. For a vehicle which is unloaded, the tyre pressure can be calculated using the following.

$$P_{(u)} = \left( \frac{P_{(max)} - P_{(min)}}{F_{t(max)} - F_{t(min)}} \right) F_{t(u)} + \left( \frac{F_{t(min)} P_{(min)} - F_{t(min)} P_{(max)}}{F_{t(max)} - F_{t(min)}} + P_{(min)} \right) \quad (2)$$

Where:
$P_{(u)}$=The calculated tyre pressure in bar for a given sensing element load $F_{t(u)}$ (for the unloaded vehicle).
$F_{t(u)}$=The measured sensing element load.
$P_{(max)}$, $P_{(min)}$=Tyre pressure in bar at the maximum and minimum rated tyre pressure (constants).
$F_{t(max)}$, $F_{t(min)}$=The sensing element load reading at the maximum and minimum rated tyre pressure (constants)

Example 1

A vehicle's tyres are deflated to the minimum tyre pressure rating of 1.6 bar, the vehicle is then driven over the apparatus and the sensing element load reading is measured as 1000. The vehicle tyres are then inflated to the maximum tyre pressure rating of 2.0 bar, the vehicle is again driven over the apparatus and the sensing element load reading is measured as 1200.

$$P_{(min)}=1.6 \text{ bar}, P_{(max)}=2.0 \text{ bar}, F_{t(min)}=1000, F_{t(max)}=1200$$

$$P_{(u)} = \left(\frac{2.0-1.6}{1200-1000}\right)F_{t(u)} + \left(\frac{1000 \times 1.6 - 1000 \times 2.0}{1200-1000} + 1.6\right)$$

Thus, using equation (2) the pressure calculation formula for this sample tyre becomes:

$$P_{(u)}=0.002F_{t(u)}-0.4 \qquad (3)$$

The sample tyre is now inflated to an unknown pressure. The vehicle is driven over the apparatus and the sensing element load $F_{t(u)}$ reading is measured as 1150. The pressure (in bar) can now be calculated as:

$$P_{(u)}=(0.002 \times 1150)-0.4$$

From which the tyre inflation pressure $P_{(u)}=1.9$ bar. Thus, for this particular type of tyre, and for a given vehicle weight (in this case, the unloaded weight) the tyre pressure can be calculated.

However, it has been established that there is a relationship between the sensing element load reading and the weight of the vehicle, for a given tyre inflation pressure.

Assume that, for a fixed tyre pressure, there is a linear relationship between the load reading from a sensing element $F_t$ and the force acting on the tyre i.e. $F_t \propto W$. It is possible to derive a ratio between the two which will allow the sensing element value to be weight adjusted for a vehicle loaded with an unknown weight. This ratio $$(\text{"}TWR\text{"}) = \frac{\Delta F_t}{\Delta W}.$$

Thus:

$$TWR = \frac{F_{t(l)} - F_{t(u)}}{W_{(l)} - W_{(u)}} \qquad (4)$$

Where:
$F_{t(u)}$, $F_{t(l)}$=The sensing element load reading in the vehicle's 'unloaded' (u) and 'loaded' (l) state (constants).
$W_{(u)}$, $W_{(l)}$=The total weight on the platform, measured using the first array of sensors, in the vehicle's 'unloaded' and 'loaded' state (constants)

Example 2

The same test vehicle and test tyre as used the previous example has its tyres inflated to a nominal pressure of 1.8 bar. The 'unloaded' vehicle is then driven over the platform. The sensing element load value from the linear sensor array is measured as 1100 and total load value using the first array of sensors is measured as 500. The vehicle is then loaded with weight until the vehicle is in its 'loaded' state. The vehicle is again driven over the platform. The sensing element value is measured as 1150 and the total load value is measured at 700.

$$F_{t(u)} = 1100, F_{t(l)} = 1150, W_{(u)} = 500, W_{(l)} = 700$$

$$\text{Ratio}(TWR) = \frac{1150-1100}{700-500}$$

$$TWR = 0.25 \frac{AD_{(F_t)}}{AD_{(W)}}$$

Where:
$AD_{(F_t)}$=The unit of measurement for a sensing element reading in the linear array.
$AD_{(W)}$=The unit of measurement for the total load reading.

Using the ratio (TWR), it is possible to calculate an adjusted sensing element load value $F_{t(u)}$ for the vehicle in its unloaded state.

$$F_{t(u)} = F_t - TWR(W - W_{(u)})$$

Thus $$F_{t(u)} = F_t - \left[\left(\frac{F_{t(l)} - F_{t(u)}}{W_{(l)} - W_{(u)}}\right)(W - W_{(u)})\right] \qquad (5)$$

Where:
$F_{t(u)}$=The adjusted sensing element load value for the vehicle in its unloaded state.
$F_t$=The sensing element load value for a unknown vehicle weight W (variable).
W=The measured total force acting on the tyre (variable).
$W_{(u)}$=The total force acting on the tyre) in the vehicle 'unloaded' state (constant).

Example 3

Using the same test vehicle and test tyre as used in the previous examples:

$$F_{t(u)}=F_t-[(0.25)(W-500)]$$

$$F_{t(u)}=F_t-0.25W+125 \qquad (6)$$

Pressure Calculation for a Variable Vehicle Weight

It is now possible to calculate the tyre pressure for the tyre, with variable vehicle weight.

Taking the original formula for a pressure calculation for a fixed weight or 'unloaded' vehicle and substitute in $F_{(u)}$ from the formula above, we get a formula to calculate the pressure at any given weight:

$$P = \left(\frac{P_{(max)} - P_{(min)}}{F_{t(max)} - F_{t(min)}}\right)\left(F_t - \left[\left(\frac{F_{t(l)} - F_{t(u)}}{W_{(l)} - W_{(u)}}\right)(W - W_{(u)})\right]\right) + \qquad (7)$$

$$\left( \frac{F_{t(min)}P_{(min)} - F_{t(min)}P_{(max)}}{F_{t(max)} - F_{t(min)}} + P_{(min)} \right)$$

Where:

P=The calculated pressure $F_t$=The sensing element reading from the linear array (variable).

W=The total load acting on through the tyre as measured by the first set of sensors (variable).

All the other parts of the equation are constants as previously defined:

$P_{(min)}$, $P_{(max)}$=Tyre pressure in bar at the tyre's maximum and minimum rated pressures (vehicle in unloaded state).

$F_{t(min)}$, $F_{t(max)}$=The sensing element reading at $P_{(min)}$ and $P_{(max)}$ (vehicle in unloaded state).

$W_{(u)}$, $W_{(l)}$=The total load readings from the first array of sensors with the vehicle in the unloaded and loaded state (tyres at a 'nominal' pressure).

$F_{t(u)}$, $F_{t(l)}$=The sensing element readings with the vehicle in the unloaded and loaded states (tyres at a 'nominal' pressure)

Example 4

Using the original example and pressure calculation formula (for a vehicle of fixed 'unloaded' weight), $P_{(u)}$=$0.002F_{t(u)}$−0.4 and substituting in the formula for the weight adjusted sensing element reading, $F_{t(u)}$=$F_t$−0.25W+125, provides a formula to calculate the tyre pressure for any given weight:

$P=0.002(F_t−0.25W+125)−0.4$ $P=0.002F_t−0.0005W+0.25−0.4$

Thus:

$$P=0.002F_t-0.0005W-0.15 \quad (8)$$

If the vehicle is loaded to an unknown load and the tyres are inflated to an unknown pressure, a tyre is driven over the platform and the system calculates W as 600 and $F_t$ as 1175, the inflation pressure can be calculated as:

$P=(0.002\times1175)−(0.0005\times600)−0.15$

Giving P=1.9 bar

It will be appreciated that it is not necessary to use actual load or weight values and units. The calculations can use raw data, or intermediate data, such as the outputs from analogue to digital converters (ADC's) that could in theory be processed to give an actual load or an actual weight and are thus indicative of such load or weight.

The above examples are non-limiting and other calculations are possible. These examples assume linear relationships but alternative formulae using non-linear relationships might be devised.

Figure 26:
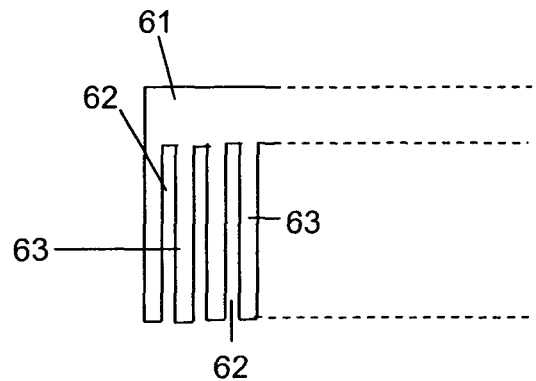
FIG. 26 is a view of the alternate substrate shown in FIG. 25 showing a number of parallel, equally spaced slots 62 are cut into the substrate to define the individual parallel beams 63.

FIG. 25 shows an alternative substrate design for use in manufacturing a sensor array, which is a modification of that described with reference to FIG. 9. The substrate sheet 61 may be of any suitable material such as stainless steel, coated in a dielectric material. As shown in FIG. 26, a number of parallel, equally spaced slots 62 are cut into the substrate, for example using a laser cutter, to define the individual parallel beams 63. The slots start at a point spaced from one edge of the sheet, but continue to the other edge. The beams 63 are therefore cantilevered, being supported only at one end.

Figure 27:
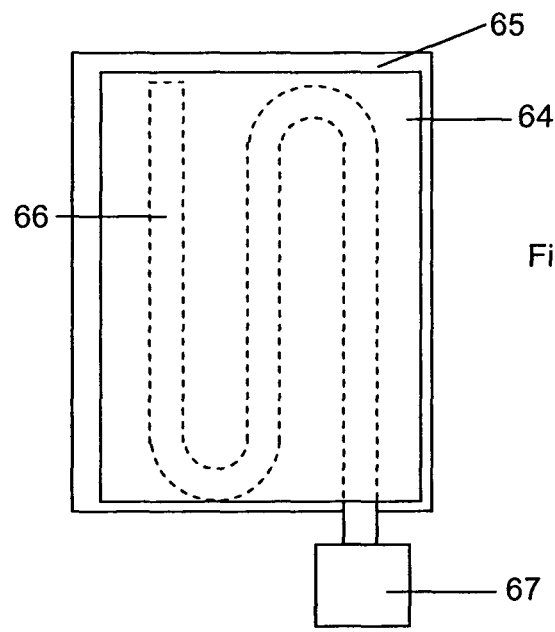
FIG. 27 is a plan view of an alternative sensor arrangement between the platform and base.

FIG. 27 shows an alternative first sensor system. Instead of a sensor array between a platform 64 and a base 65, there is a single sensor 66. This is in the form of a fluid filled tube which follows a serpentine path. This is connected to a pneumatic or hydraulic pressure sensing device 67. As the load on the platform increases or decreases, the pressure inside the tube 66 goes up or down, and this is detected by the sensing device 67.

An embodiment of the invention thus provides apparatus (4; 5) for checking the inflation pressure of a tyre (3) of a vehicle (2) whilst the tyre is being moved over the apparatus in a direction of travel (A). The apparatus comprises a base (7), a platform (8) which is mounted over the base, a first load sensor system (9) arranged between the platform and the base, and a second load sensor system (12) mounted on an upper surface of the platform and comprising a linear array of high resolution sensors (13, 25) extending across the platform. A data processing unit (6) processes data obtained by sampling the outputs of the first and second sensor systems and provides an indication of the inflation pressure of the tyre. The data obtained by sampling the output of the first sensor system may be used to determine the total load borne by the platform, and/or the direction of travel of the tyre over the platform, and/or the speed of travel of the tyre over the platform and/or the tracking angle of the vehicle tyre. The data may also be used to determine a time interval during which data from the second sensor system is to be used to provide a representative sensor load value.

It will be appreciated that the described embodiments are for illustrative purposes only and that there may be many alterations, modifications, and equivalent structures and processing steps, without departing from the scope of the invention claimed.

The invention claimed is:

1. Apparatus for checking the inflation pressure of a vehicle tyre whilst being moved over the apparatus in a direction of travel, comprising:

a lateral array of sensors extending across the direction of travel, the array having a lateral extent sufficient to accommodate the width of a vehicle tyre, wherein each of the sensors in the lateral array is a load sensor which provides varying outputs indicative of the value of the load on the sensor whilst the tyre is moved in the direction of travel;

a first sampling system for sampling the outputs of the sensors of the lateral array;

a data processing system configured to process the data obtained from sampling the outputs of the sensors of the lateral array;

a platform mounted over a base and having an upper surface on which the lateral array of sensors is mounted, the platform being of sufficient extent in the direction of travel and laterally of the direction of travel to accommodate the entire footprint of a vehicle tyre;

a platform load sensor system disposed between the platform and the base, for providing data indicative of varying loads exerted on the base by the platform whilst the tyre is moved over the platform in the direction of travel; and a second sampling system for sampling the outputs of the platform load sensor system;

wherein the data processing system is also configured to process the data obtained from sampling the outputs of the platform load sensor system so that the data obtained from sampling the outputs of the platform load sensor system are processed to provide an indication of the total load of the tyre borne by the platform, and the data processing system is configured so as to calculate the inflation pressure of the tyre as a function of (i) the processed data obtained from sampling the outputs of the sensors of the lateral array and (ii) the total load of the tyre borne by the platform; whereby the tyre footprint area is not used in the calculation of the tyre inflation pressure.

2. Apparatus as claimed in claim 1 wherein the data processing system is configured so that the processed data obtained from sampling the outputs of the sensors of the lateral array is a representative sensor load value.

3. Apparatus as claimed in claim 2, wherein the representative sensor load value is obtained using the output of the sensor of the lateral array of sensors which provides the highest value.

4. Apparatus as claimed in claim 2, wherein the representative sensor load value is obtained from averaging the values output from the sensors of the lateral array of sensors.

5. Apparatus as claimed in claim 4, wherein the representative sensor load value is obtained from averaging the values output from a range of sensors of the lateral array of sensors which provide the highest values.

6. Apparatus as claimed in claim 4, wherein the representative sensor load value is obtained from averaging the values output from a range of sensors of the lateral array of sensors, excluding extreme values.

7. Apparatus as claimed in claim 2, wherein calculation of the tyre inflation pressure includes evaluation of the equation:

$$P = aF_s + b$$

where P is the inflation pressure, $F_s$ is the representative sensor load value, and at least one of a and b varies as a function of the total load of the tyre borne by the platform.

8. Apparatus as claimed in claim 1, wherein the platform load sensor system comprises a plurality of sensors distributed as an array over the base, and the data processing system is configured to process the data obtained from sampling the outputs of the platform load sensor system so as to obtain data representative of an angle of travel of the tyre over the lateral array.

9. Apparatus as claimed in claim 8, wherein the data processing system is configured so that the angle of travel of the tyre over the lateral array of sensors is used in calculation of the tyre inflation pressure.

10. Apparatus as claimed in claim 1, wherein the data processing system is configured to process the data obtained from sampling the outputs of the platform load sensor system so as to obtain data representative of the speed of travel of the tyre over the platform.

11. Apparatus as claimed in claim 1, wherein the lateral array of sensors is a linear array.

12. Apparatus as claimed in claim 1, wherein the platform load sensor system comprises a plurality of sensors at points distributed longitudinally and laterally over the base, to indicate the loads on the base from the platform at various points.

13. Apparatus as claimed in claim 12, wherein the platform load sensor system comprises a plurality of laterally extending rows of sensors.

14. Apparatus as claimed in claim 13, wherein the sensors of the platform load sensor system are also arranged in columns.

15. Apparatus for checking the inflation pressure of a vehicle tyre whilst being moved over the apparatus in a direction of travel, comprising:
a lateral array of sensors extending across the direction of travel, the array having a lateral extent sufficient to accommodate the width of a vehicle tyre, wherein each of the sensors in the lateral array is a load sensor which provides varying outputs indicative of the value of the load on the sensor, whilst the tyre is moved in the direction of travel; a first sampling system for sampling the outputs of the sensors of the lateral array; and a data processing system configured to process the data obtained from sampling the outputs of the sensors of the lateral array so as to provide a first value, which is indicative of the pressure imposed by the tyre on sensors of the lateral array;
a platform mounted over a base and having an upper surface on which the lateral array of sensors is mounted, the platform being of sufficient extent in the direction of travel and laterally of the direction of travel to accommodate the entire footprint of a vehicle tyre; a platform load sensor system disposed between the platform and the base; and a second sampling system for sampling the outputs of the platform load sensor system;
wherein the data processing system is also configured to process the data obtained from sampling the outputs of the platform load sensor system so as to provide a second value, which is indicative of the total load imposed on the platform by the tyre; and
the tyre inflation pressure is calculated as a function of the first value, indicative of the pressure imposed by the tyre on sensors of the lateral array, and of the second value, indicative of the total load imposed on the platform by the tyre.

16. Apparatus as claimed in claim 15, wherein the first value, which is indicative of the pressure imposed by the tyre on sensors of the lateral array, is based on a representative sensor load value of the sensors of the lateral array.

17. Apparatus as claimed in claim 16, wherein the representative sensor load value is obtained using the output of a sensor of the lateral array of sensors which provides the highest value.

18. Apparatus as claimed in claim 16, wherein the representative sensor load value is obtained from averaging the values output from the sensors of the lateral array of sensors.

19. Apparatus as claimed in claim 16, wherein the representative sensor load value is obtained from averaging the values output from a range of sensors of the lateral array of sensors which provide the highest values.

20. Apparatus as claimed in claim 16, wherein the representative sensor load value is obtained from averaging the values output from a range of sensors of the lateral array of sensors, excluding extreme values.

21. Apparatus for checking the inflation pressure of a vehicle tyre whilst being moved over the apparatus in a direction of travel, comprising:
a lateral array of sensors extending across the direction of travel, the array having a lateral extent sufficient to accommodate the width of a vehicle tyre, wherein each of the sensors in the lateral array is a load sensor which provides varying outputs indicative of the value of the load on the sensor whilst the tyre is moved in the direction of travel;
a first sampling system for sampling the outputs of the sensors of the lateral array;
a data processing system configured to process the data obtained from sampling the outputs of the sensors of the lateral array;
a platform mounted over a base and having an upper surface on which the lateral array of sensors is mounted, the platform being of sufficient extent in the direction of travel and laterally of the direction of travel to accommodate the entire footprint of a vehicle tyre;
a platform load sensor system disposed between the platform and the base, for providing data indicative of varying loads exerted on the base by the platform whilst the tyre is moved over the platform in the direction of travel; and a second sampling system for sampling the outputs of the platform load sensor system;

wherein the data processing system is also configured to process the data obtained from sampling the outputs of the platform load sensor system, and to calculate an indication of the tyre inflation pressure of the tyre using the processed data obtained from sampling the outputs of the sensors of the lateral array and the processed data obtained from sampling the outputs of the platform load sensor system, the tyre inflation pressure being calculated without use of the tyre footprint area.

22. Apparatus for checking the inflation pressure of a vehicle tyre whilst being moved over the apparatus in a direction of travel, comprising: a lateral array of sensors extending across the direction of travel, the array having a lateral extent sufficient to accommodate the width of a vehicle tyre, and wherein each of the sensors in the lateral array is a load sensor which provides varying outputs indicative of the value of the load on the sensor whilst the tyre is moved in the direction of travel; a first sampling system for sampling the outputs of the sensors of the lateral array, and a data processing system configured to process the data obtained from sampling the outputs of the sensors of the lateral array and to calculate an indication of the inflation pressure of the tyre using such processed data;

wherein the lateral array of sensors is mounted on an upper surface of a platform which is mounted over a base, the platform being of sufficient extent in the direction of travel and laterally of the direction of travel to accommodate the entire footprint of a vehicle tyre; a platform load sensor system is arranged between the platform and the base, for providing data indicative of varying loads exerted on the base by the platform whilst the tyre is moved over the platform in the direction of travel; a second sampling system is provided for sampling the outputs of the platform load sensor system; and the data processing system is configured to process the data obtained from sampling the outputs of the platform load sensor system.

* * * * *